(12) United States Patent
Loccufier et al.

(10) Patent No.: US 9,718,971 B2
(45) Date of Patent: Aug. 1, 2017

(54) CURABLE LIQUIDS AND INKJET INKS FOR FOOD PACKAGING APPLICATIONS

(71) Applicant: Agfa Graphics NV, Mortsel (BE)

(72) Inventors: Johan Loccufier, Mortsel (BE); Roel De Mondt, Mortsel (BE)

(73) Assignee: AGFA GRAPHICS NV, Mortsel (BE)

( * ) Notice: Subject to any disclaimer, the term of this patent is extended or adjusted under 35 U.S.C. 154(b) by 513 days.

(21) Appl. No.: 14/351,596

(22) PCT Filed: Nov. 30, 2012

(86) PCT No.: PCT/EP2012/074099
§ 371 (c)(1),
(2) Date: Apr. 14, 2014

(87) PCT Pub. No.: WO2013/087427
PCT Pub. Date: Jun. 20, 2013

(65) Prior Publication Data
US 2014/0285568 A1    Sep. 25, 2014

Related U.S. Application Data

(60) Provisional application No. 61/577,102, filed on Dec. 19, 2011.

(30) Foreign Application Priority Data

Dec. 16, 2011 (EP) .................................... 11193943

(51) Int. Cl.
| | |
|---|---|
| *C09D 11/101* | (2014.01) |
| *C09D 11/00* | (2014.01) |
| *B41M 5/00* | (2006.01) |
| *B41M 5/52* | (2006.01) |
| *C09D 11/322* | (2014.01) |
| *B41J 2/01* | (2006.01) |
| *C09D 11/02* | (2014.01) |

(52) U.S. Cl.
CPC ............... *C09D 11/005* (2013.01); *B41J 2/01* (2013.01); *B41M 5/0047* (2013.01); *B41M 5/5209* (2013.01); *B41M 5/5254* (2013.01); *C09D 11/02* (2013.01); *C09D 11/101* (2013.01); *C09D 11/322* (2013.01)

(58) Field of Classification Search
CPC ..... C09D 11/005; C09D 11/54; C09D 11/101; C09D 11/322; C09D 11/324
See application file for complete search history.

(56) References Cited

U.S. PATENT DOCUMENTS

| | | | |
|---|---|---|---|
| 6,500,981 B1 | 12/2002 | Weipert | |
| 6,803,112 B1 | 10/2004 | Chatterjee et al. | |
| 8,883,873 B2 * | 11/2014 | Loccufier | C08F 2/50 522/34 |
| 2003/0199655 A1 | 10/2003 | Yurugi et al. | |
| 2006/0014848 A1 | 1/2006 | Loccufier et al. | |
| 2008/0021126 A1 * | 1/2008 | Dietliker | C08F 2/50 522/34 |
| 2008/0213550 A1 | 9/2008 | Watanabe | |
| 2010/0209846 A1 | 8/2010 | Strehmel et al. | |
| 2011/0024392 A1 | 2/2011 | Sato et al. | |

FOREIGN PATENT DOCUMENTS

| | | | | |
|---|---|---|---|---|
| BE | WO 2010133381 A1 * | 11/2010 | | C08F 2/50 |
| EP | 0997508 A1 | 5/2000 | | |
| EP | 1770132 A1 | 4/2007 | | |
| EP | 2053101 A1 | 4/2009 | | |
| EP | 2053103 A1 | 4/2009 | | |
| JP | WO 2009118976 A1 * | 10/2009 | | C09D 11/101 |
| WO | 2007/018425 A1 | 2/2007 | | |

OTHER PUBLICATIONS

Official Communication issued in International Patent Application No. PCT/EP2012/074099, mailed on Jan. 25, 2013.

* cited by examiner

*Primary Examiner* — Gerard Higgins
(74) *Attorney, Agent, or Firm* — Keating and Bennett, LLP

(57) ABSTRACT

A radiation curable liquid includes at least one free radical polymerizable monomer or oligomer, at least one diffusion hindered acetalyzation catalyst, and at least one diffusion hindered hydroxyl containing compound. The radiation curable liquid applied to a substrate prevents migration of very low viscous monomers, such as vinyl ether acrylate monomers, into the substrate.

10 Claims, No Drawings

CURABLE LIQUIDS AND INKJET INKS FOR FOOD PACKAGING APPLICATIONS

CROSS-REFERENCE TO RELATED APPLICATIONS

This application is a 371 National Stage Application of PCT/EP2012/074099, filed Nov. 30, 2012. This application claims the benefit of U.S. Provisional Application No. 61/577,102, filed Dec. 19, 2011, which is incorporated by reference herein in its entirety. In addition, this application claims the benefit of European Application No. 11193943.5, filed Dec. 16, 2011, which is incorporated by reference herein in its entirety.

BACKGROUND OF THE INVENTION

1. Field of the Invention

The present invention relates to radiation curable liquids and inkjet inks and their use in inkjet printing methods for food packaging applications.

2. Description of the Related Art

In inkjet printing, tiny drops of ink fluid are projected directly onto an ink-receiver surface without physical contact between the printing device and the ink-receiver. The printing device stores printing data electronically and controls a mechanism for ejecting the drops image-wise. Printing is accomplished by moving a print head across the ink-receiver or vice versa or both.

The use of radiation curable inkjet inks is preferred for inkjet printing on non-absorbing ink-receivers. In industrial ink jet systems, there is a constant demand for increased printing speeds in combination with high image quality. The new print heads designed for increasing printing speed only operate with very low viscous inkjet inks. Suitable monomers to obtain such very low viscous ink jet inks have been described in EP 0997508 A (AGFA) that discloses radiation curable monomers containing vinylether and acrylate functions.

However, migrateable residues in cured layers of inkjet ink on packaging of foodstuffs may present a health risk and consequently they should be kept to an absolute minimum, i.e. within limits of applicable legislations such as the Swiss ordinance SR 817.023.21 on Objects and Materials. UV-curable inks generally contain colorants, monomers, photoinitiators and polymerization synergists. A known measure to reduce extractables of the photoinitiating system from cured ink layers is the use of diffusion hindered compounds, such as polymeric or polymerizable photoinitiators and co-initiators, instead of the usual low molecular weight compounds. For example, US 2006014848 (AGFA) discloses radiation curable inkjet inks comprising a polymeric co-initiator comprising a dendritic polymer core with at least one co-initiating functional group as an end group. Aliphatic amines and aromatic amines are included as suitable co-initiating functional groups. The dendritic polymeric architecture allows to obtain low extractables and at the same time to minimize the increase in viscosity of the ink.

The colorants used in curable inkjet inks can be dyes, but are generally colour pigments which together with a polymeric dispersant attached to the surface of the pigment are usually very difficult to extract. The remaining problem for extractables is the monomers. The use of polymerizable oligomers or crosslinkable polymers instead of low molecular weight monomers is only possible up to a certain amount in the ink due to limitations of inkjet printing requiring the inks to possess a low viscosity at the jetting temperature.

Specific mixtures of monomers as in EP 2053101 A (AGFA) and EP 2053103 A (AGFA) were found for minimizing the amount of unreacted monomers that can be extracted. Extractable monomers can however cause problems in two different ways: set-off and migration. Set-off occurs in roll-to-roll printing where the printed front-side of a packaging material comes into contact with the unprinted back-side and unreacted monomers are set off on the back-side intended for direct food contact. The unwanted transfer of unreacted monomers to the food is by migration through the packaging material.

Popular packaging materials suffering from such migration are usually olefin based substrates like polyethylene or polypropylene film. Due to the low viscosity of radiation curable inkjet inks, monomers easily penetrate into the substrate before they can be effectively cured.

One approach to reduce monomers migrating into a packaging material is by replacing them with water. U.S. Pat. No. 6,803,112 (SUN CHEMICAL) discloses a method for producing a low-extractable film packaging from an actinic radiation curable aqueous composition containing a water soluble compound having at least one $\alpha,\beta$-ethylenically unsaturated, radiation polymerizable group and water as essential components carried out by applying the aqueous composition to a surface which is then irradiated in a single step with actinic radiation in the presence of the water thereby forming a cured film wherein less than 50 ppb of the water soluble compound or its residual components are extractable by a food simulant. However, the inclusion of large amounts of water in the curable inkjet ink leads to latency problems in the print head and to inferior image quality due to the spreading characteristics of water on substantially non-absorbing ink-receivers.

There is widespread belief that cationic inkjet inks would be more suitable for food packaging applications. Cationic inkjet inks tend to polymerize slower than free radical polymerizable inkjet inks but to a larger extent. However, there is currently no evidence that cationically polymerizable monomers would pose no or less problems for migration into packaging materials.

US 2003199655 (NIPPON CATALYTIC CHEM) discloses a reactive diluent composition comprising a vinyl ether group-containing (meth)acrylic ester and a hydroxyl group-containing polymerizable compound and/or divinyl ether, for use in an activated energy ray-curable ink composition for ink-jet printing.

Therefore, it would be desirable to reduce or eliminate the set-off and migration of unreacted monomers of radiation curable inkjet inks in printing on polyethylene and polypropylene based food packaging materials so that health risks are minimized.

SUMMARY OF THE INVENTION

Preferred embodiments of the present invention provide a radiation curable liquid as defined below.

Further preferred embodiments of the present invention provide a combination of such a radiation curable liquid and a radiation curable inkjet ink including at least 20 wt % vinyl ether acrylate.

Further preferred embodiments of the present invention provide a substrate applied with the radiation curable liquid and the radiation curable inkjet ink.

Further preferred embodiments of the present invention provide an inkjet printing method including the application of the radiation curable liquid and jetting the radiation curable inkjet ink including at least 20 wt % of vinyl ether acrylate.

A surprisingly simple method was found to solve the above cited problems by using a radiation curable liquid including at least one free radical polymerizable monomer or oligomer, at least one diffusion hindered acetalysation catalyst and at least one diffusion hindered hydroxyl containing compound as a primer to prevent migration of very low viscous monomers, such as vinyl ether acrylate monomers, into a substrate and as an overprint varnish to prevent set-off on the back side of the printed packaging material.

Further advantages and embodiments of the present invention will become apparent from the following description.

DETAILED DESCRIPTION OF THE PREFERRED EMBODIMENTS

Definitions

The term "diffusion hindered compound" is used for a compound which is multifunctional, oligomeric, polymeric or polymerizable, preferably polymeric or polymerizable.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more substituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

The term "monofunctional monomer" means a monomer having only one polymerizable group, for example an acrylate group.

The term "polyfunctional monomer" means a monomer having two, three or more polymerizable groups, e.g. two acrylate groups and one vinyl ether group.

Radiation Curable Liquids

A radiation curable liquid according to a preferred embodiment of the present invention includes at least one free radical polymerizable monomer or oligomer, at least one diffusion hindered acetalysation catalyst and at least one diffusion hindered hydroxyl containing compound.

A compound is considered as diffusion hindered when it is multifunctional, oligomeric, polymeric or polymerizable. Polymerizable is defined as containing at least one free radical polymerizable group, such as an acrylate group, a methacrylate group, a vinylether group, a styrene group, an acrylamide group, a methacrylamide group, an allyl ester group, an allyl ether group, a vinyl ester group, a fumarate group, a maleate group, a maleimide group and a vinyl nitrile group.

In a preferred embodiment, the radiation curable liquid includes also at least one diffusion hindered photoinitiator.

In a very preferred embodiment, the radiation curable liquid consists essentially of:
50.0 to 98.5 wt % of free radical polymerizable monomer or oligomer;
0.5 to 20.0 wt % of diffusion hindered acetalysation catalyst;
1.0 to 30.0 wt % of diffusion hindered hydroxyl containing compound;
0 to 20.0 wt % of diffusion hindered photoinitiator;
0 to 20.0 wt % of diffusion hindered co-initiator;
0 to 35.0 wt % of white pigment;
0 to 25.0 wt % of polymeric dispersant; and
0 to 10.0 wt % of surfactant.

The radiation curable liquid according to a preferred embodiment of the present invention can be used as a primer to prevent migration of very low viscous monomers into a substrate and as an overprint varnish to prevent set-off on the back side of the printed packaging material.

A cured primer is a cured layer between the substrate and the image printed by one or more radiation curable inkjet inks. The primer can be transparent or pigmented. A white pigmented primer, typically containing e.g. titanium dioxide, is preferably used to enhance the contrast and the vividness of colour inks printed on a primed substrate. This is especially effective when the substrate is transparent. Preferred white pigments are disclosed in paragraphs [0072] to [0075] of EP 2053099 A (AGFA).

A cured overprint varnish is a transparent or translucent cured layer applied on top of the image printed by one or more radiation curable inkjet inks.

Before curing, the radiation curable liquid preferably has a viscosity from 1 mPa·s to 1,200 mPa·s, more preferably from 300 mPa·s to 800 mPa·s at 25° C. and at a shear rate of 100 $s^{-1}$.

The monomers and oligomers used in the radiation curable liquid are preferably difunctional monomers, trifunctional of higher functional monomers. In a preferred embodiment, the monomers and oligomers are selected from the group consisting of diacrylates, triacrylates, tetraacrylates, pentaacrylates and hexaacrylates.

Diffusion Hindered Acetalysation Catalysts

The radiation curable liquid according to a preferred embodiment of the present invention, useful as primer or as overprint varnish, comprises at least one diffusion hindered acetalysation catalyst.

Suitable acetalysation catalysts are proton acids with a sufficiently low $pK_a$, such as sulfonic acids, phosphonic acids or monoesters of phosphonic acids, phosphoric acid derivatives such as monoesters or diesters of phosphoric acid, sulfuric acid derivatives such as monoesters of sulfuric acid and halogenated carboxylic acids such as trichloro- or trifluoro acetic acid.

Preferred acetalysation catalysts are salts of aromatic nitrogen containing heterocycles, such as sulfonic acid salts of pyridines. Sulfonic acids, monoesters and diesters of phosphoric acid, phosphonic acids and monoesters of phosphonic acids and sulfonic acid salts of pyridines are particularly preferred catalysts.

In a preferred embodiment of the radiation curable liquid according to the present invention, the acetalysation catalyst is selected from the group consisting of a polymeric sulfonic acid, an oligomeric sulfonic acid, a polymerizable sulfonic acid, a polymeric phosphoric acid, an oligomeric phosphoric acid, a polymerizable phosphoric acid, a polymeric phosphonic acid, an oligomeric phosphonic acid, a polymerizable phosphonic acid, a polymeric pyridinium sulfonate, an oligomeric pyridinium sulfonate and a polymerizable pyridinium sulfonate.

In a more preferred embodiment, the acetalysation catalyst is selected from the group consisting of a polymeric catalyst, an oligomeric catalyst and a polymerizable catalyst, polymerizable catalysts being particularly preferred.

In a more preferred embodiment, the polymerizable catalyst contains at least one free radical polymerizable group, preferably selected from the group consisting of an acrylate group, a methacrylate group, a vinylether group, a styrene group, an acrylamide group, a methacrylamide group, an allyl ester group, an allyl ether group, a vinyl ester group, a fumarate group, a maleate group, a maleimide group and a vinyl nitrile group. The at least one free radical polymerizable group is more preferably an acrylate group or a methacrylate group, an acrylate group being the most preferred.

Preferred diffusion hindered catalysts are given below by Table 1 without being limited thereto.

TABLE 1

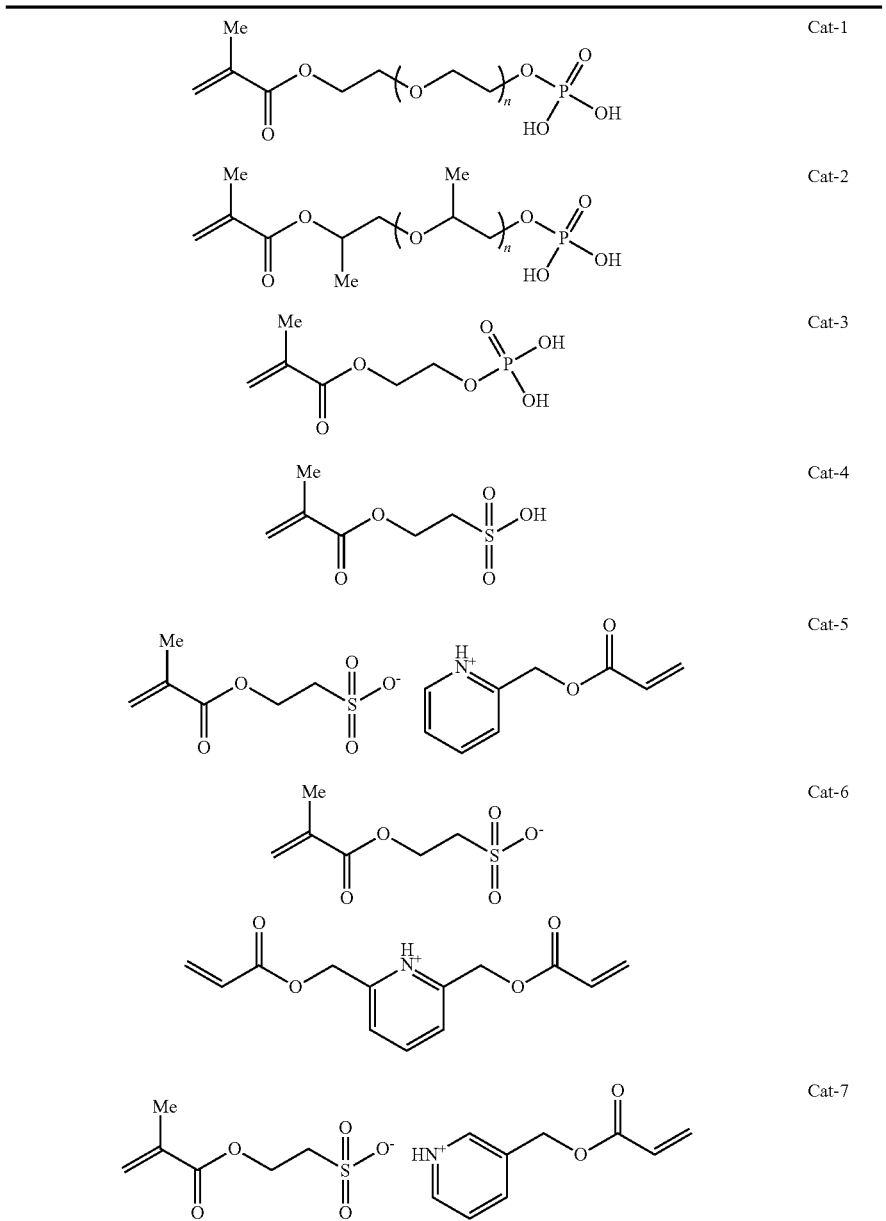

TABLE 1-continued

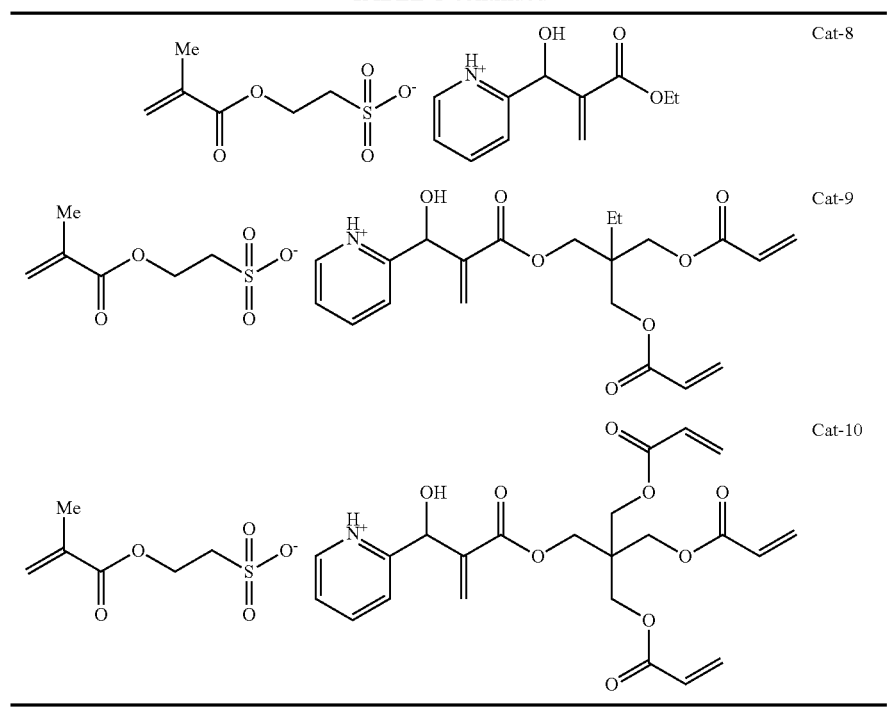

In a preferred embodiment the diffusion hindered catalyst is present in a concentration between 0.5 and 20%, more preferably between 1 and 15%, even more preferably between 2 and 10% and most preferably between 2.5 and 7% by weight of the total radiation curable liquid.

Diffusion Hindered Hydroxyl Containing Compounds

The radiation curable liquid according to a preferred embodiment of the present invention, useful as primer or as overprint varnish, further comprises at least one diffusion hindered hydroxyl containing compound.

The diffusion hindered hydroxyl containing compound is preferably selected from the group consisting of a polymeric compound, an oligomeric compound and a polymerizable compound, more preferably the diffusion hindered hydroxyl containing compound is a polymeric compound or a polymerizable compound.

In a more preferred embodiment, the diffusion hindered hydroxyl containing compound includes at least one free radical polymerizable group, preferably selected from the group consisting of an acrylate group, a methacrylate group, a vinylether group, a styrene group, an acrylamide group, a methacrylamide group, an allyl ester group, an allyl ether group, a vinyl ester group, a fumarate group, a maleate group, a maleimide group and a vinyl nitrile group. The at least one free radical polymerizable group is more preferably an acrylate group or a methacrylate group, an acrylate group being the most preferred.

Preferred diffusion hindered hydroxyl containing compounds are given by Table 2 without being limited thereto.

TABLE 2

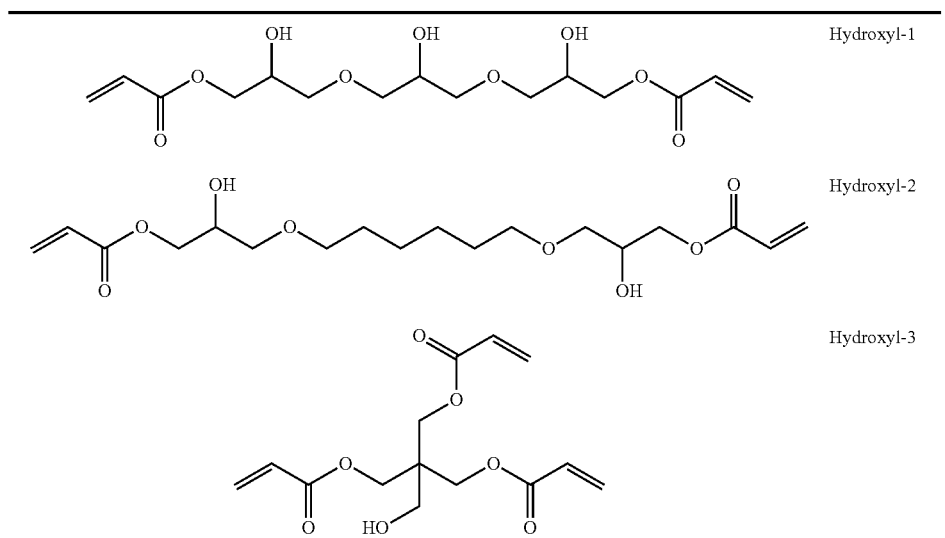

TABLE 2-continued

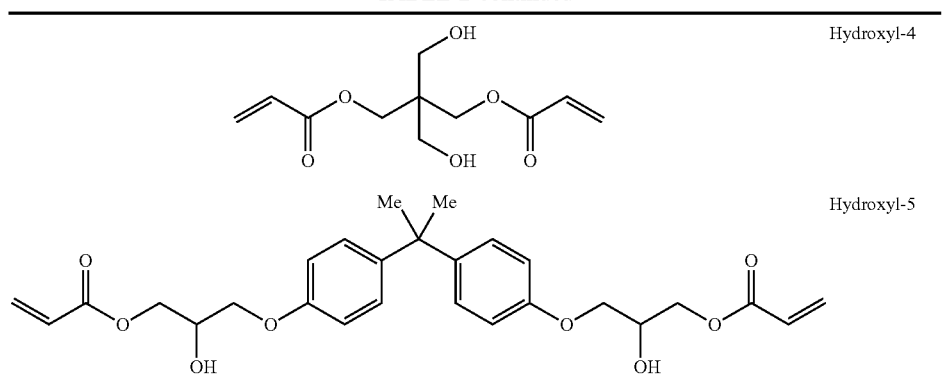

In a preferred embodiment, the diffusion hindered hydroxyl containing compound is present in a concentration between 1 and 30%, more preferably between 2 and 20% and most preferably between 5 and 15% by weight of the total radiation curable liquid.

In a preferred embodiment, the diffusion hindered hydroxyl containing compound includes at least two, three or more hydroxyl groups.

In a preferred embodiment, the at least one diffusion hindered acetalysation catalyst and at least one diffusion hindered hydroxyl containing compound may combined into a single compound containing at least one acetalysation catalyst moiety and at least one alcohol moiety. Preferably, the single compound containing at least one acetalysation catalyst moiety and at least one alcohol moiety is a polymeric compound.

Preferred polymers combining both functional groups are given by Table 3 as generic structure without being limited thereto.

TABLE 3

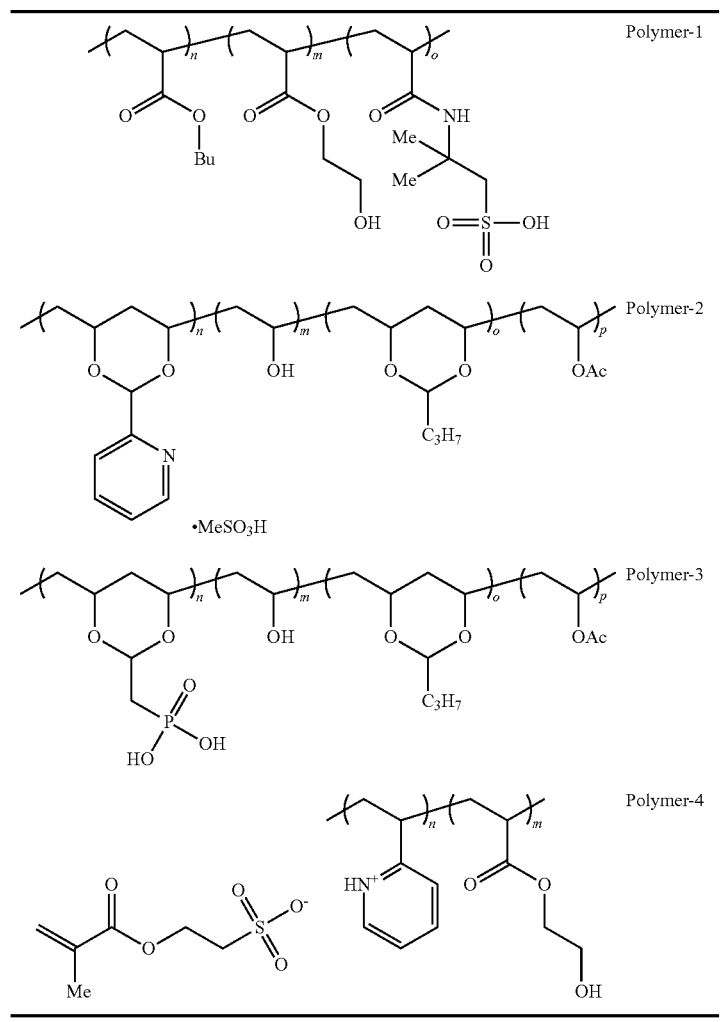

Diffusion Hindered Photoinitiators.

The curable liquid according to a preferred embodiment of the present invention, useful as primer or as overprint varnish, preferably includes at least one diffusion hindered photoinitiator.

For safety reasons, in particular for food packaging applications, the radiation curable liquid according to a preferred embodiment of the present invention contains a so-called diffusion hindered photoinitiator. A diffusion hindered photoinitiator is a photoinitiator which exhibits a much lower mobility in a cured layer than a monofunctional photoinitiator, such as benzophenone. Several methods can be used to lower the mobility of the photoinitiator. One way is to increase the molecular weight of the photoinitiator so that the diffusion speed is reduced, e.g. difunctional photoinitiators having two photoinitiating moieties or polymeric photoinitiators. Another way is to increase its reactivity so that it is built into the polymerizing network, e.g. multifunctional photoinitiators and polymerizable photoinitiators. The diffusion hindered photoinitiator is preferably selected from the group consisting of non-polymeric di- or multifunctional photoinitiators, oligomeric or polymeric photoinitiators and polymerizable photoinitiators. Non-polymeric di- or multifunctional photoinitiators are considered to have a molecular weight between 300 and 900 Dalton. Monofunctional photoinitiators with a molecular weight in that range are not diffusion hindered photoinitiators. Both type I and type II photoinitiators can be used in the present invention, alone or in combination.

In a preferred embodiment, the diffusion hindered photoinitiator is selected from the group of a polymeric photoinitiator and a polymerizable photoinitiator, a polymeric photoinitiator being most preferred.

Typical non polymeric di- and multifunctional initiators have been disclosed in WO 2005/040083 (LAMBERTI) and WO 2004/099262 (CIBA).

Further initiators, useful in the present invention have been described by Burrows et al., Surface Coatings International, Part B: Coatings Transactions 87(B2), 127-135 (2004) and by Ye et al., Polymer 47(13), 4603-4612 (2006).

Preferred non polymeric multifunctional initiators according to a preferred embodiment of the present invention are given below by Table 4 without being limited thereto.

TABLE 4

INI-A1

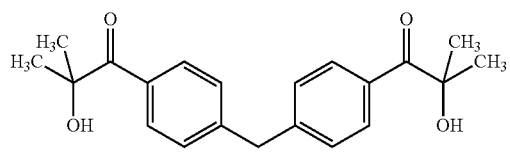 [SMILES: CC(C)(O)C(=O)c1ccc(Cc2ccc(C(=O)C(C)(C)O)cc2)cc1]

INI-A2

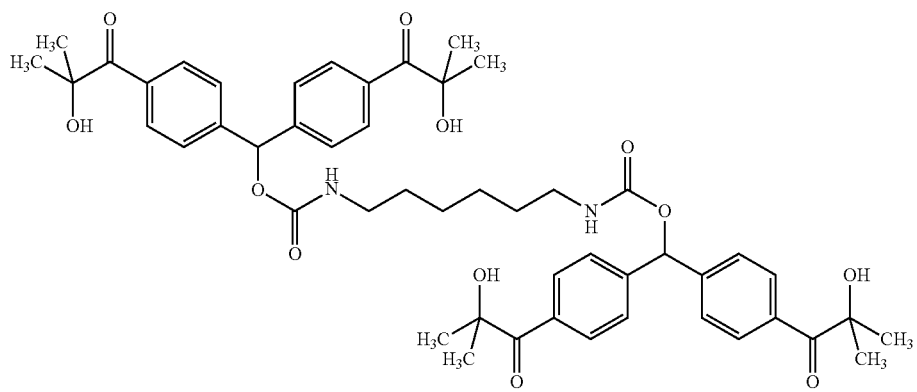 [SMILES: CC(C)(O)C(=O)c1ccc(C(OC(=O)NCCCCCCNC(=O)OC(c2ccc(C(=O)C(C)(C)O)cc2)c2ccc(C(=O)C(C)(C)O)cc2)c2ccc(C(=O)C(C)(C)O)cc2)cc1]

INI-A3

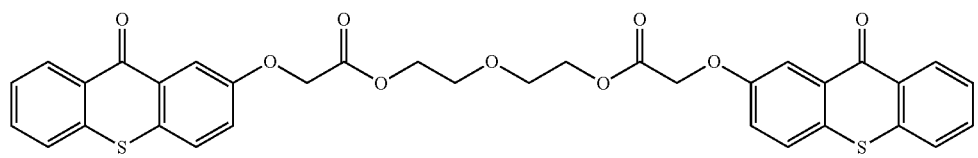 [SMILES: O=C(COc1ccc2sc3ccccc3c(=O)c2c1)OCCOCCOC(=O)COc1ccc2sc3ccccc3c(=O)c2c1]

INI-A4

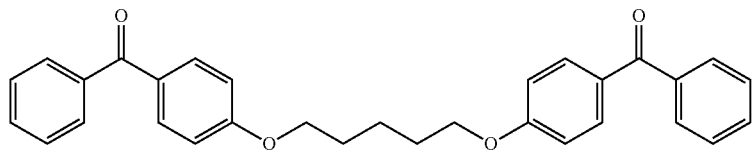 [SMILES: O=C(c1ccccc1)c1ccc(OCCCCCOc2ccc(C(=O)c3ccccc3)cc2)cc1]

TABLE 4-continued
| | |
|---|---|
| INI-A5 | 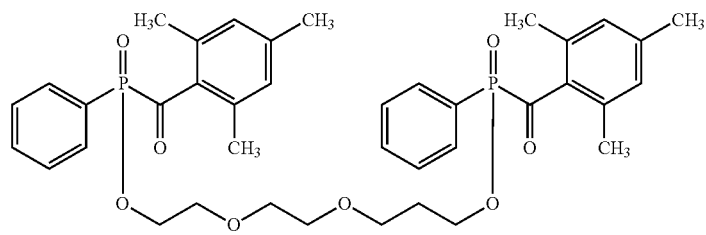 [SMILES: Cc1cc(C)c(C(=O)P(=O)(OCCCOCCOCCOP(=O)(C(=O)c2c(C)cc(C)cc2C)c2ccccc2)c2ccccc2)c(C)c1] |
| INI-A6 | 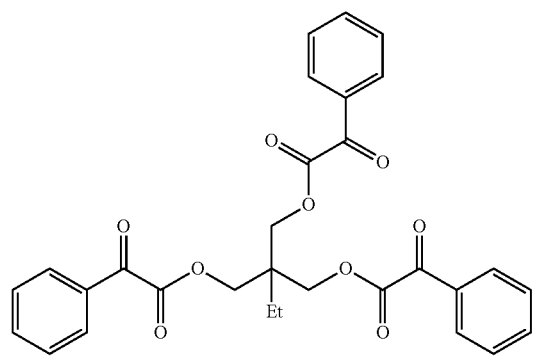 [SMILES: CCC(COC(=O)C(=O)c1ccccc1)(COC(=O)C(=O)c1ccccc1)COC(=O)C(=O)c1ccccc1] |
| INI-A7 | 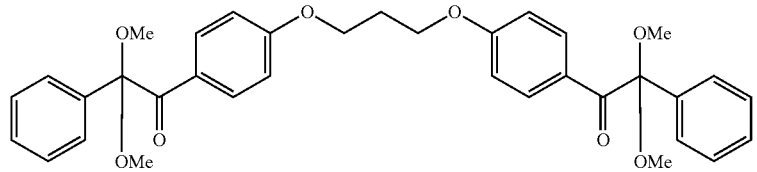 [SMILES: COC(OC)(C(=O)c1ccc(OCCCOc2ccc(C(=O)C(OC)(OC)c3ccccc3)cc2)cc1)c1ccccc1] |
| INI-A8 | 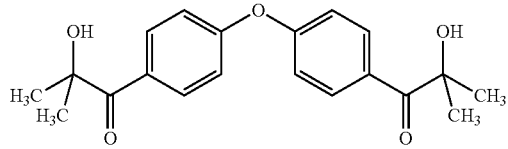 [SMILES: CC(C)(O)C(=O)c1ccc(Oc2ccc(C(=O)C(C)(C)O)cc2)cc1] |
| INI-A9 | 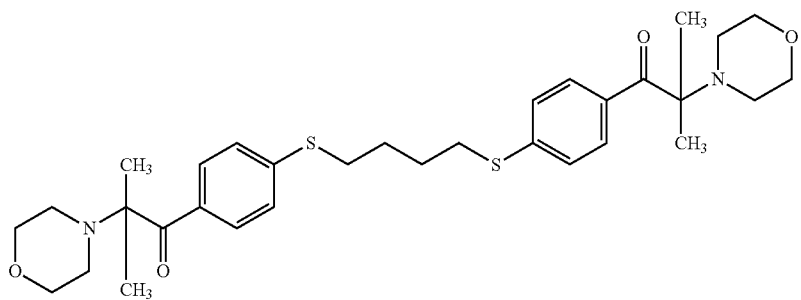 [SMILES: CC(C)(C(=O)c1ccc(SCCCCSc2ccc(C(=O)C(C)(C)N3CCOCC3)cc2)cc1)N1CCOCC1] |
| INI-A10 | 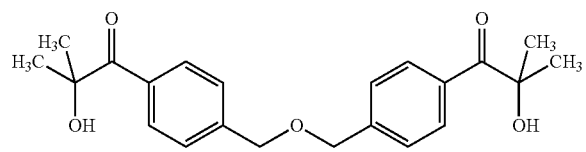 [SMILES: CC(C)(O)C(=O)c1ccc(COCc2ccc(C(=O)C(C)(C)O)cc2)cc1] |

Suitable polymeric initiators, useful in the present invention, have been recently reviewed by Hrdlovic P. (Polymer News, 30(6), 179-182 (2005) and Polymer News, 30(8), 248-250 (2005)) and Corrales T. (Journal of Photochemistry and Photobiology A: Chemistry 159 (2003), 103-114).

Further suitable macroinitiators can be found in Surface Coatings Technology, Volume III, Photoinitiators for Free Radical, Cationic and Anionic Photopolymerisation (J. V. Crivello and D. K. Dietliker, 1998, Wiley, ISBN 0471 978922), p. 208-224.

Preferred polymeric and oligomeric initiators have been disclosed by Bertens et al. (RadTech Europe 05, Conference Proceedings (2005) 1, 473-478) and in WO 03/033452 (Coates Brothers PLC, UK), WO 03/033492 (COATES BROTHERS), EP 1616920 A (AGFA), EP 1616921 A (AGFA), EP 1616899 A (AGFA) and U.S. Pat. No. 7,507,773 (AGFA).

Preferred polymeric and oligomeric initiators are given by Table 5 without being limited thereto. The hyperbranched structures are illustrated with one specific molecular weight and degree of substitution out of the mixture for the sake of clarity.

TABLE 5

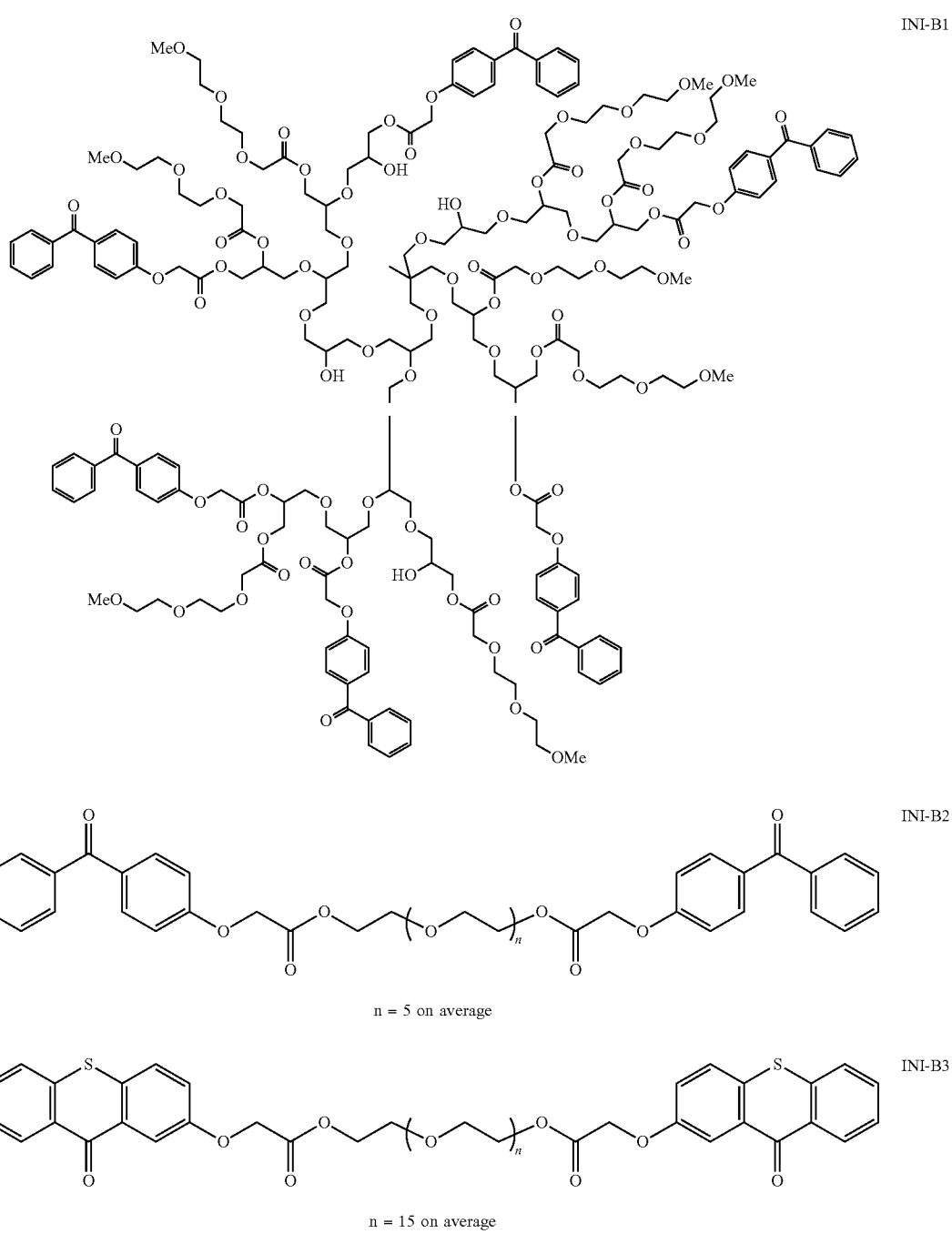

TABLE 5-continued
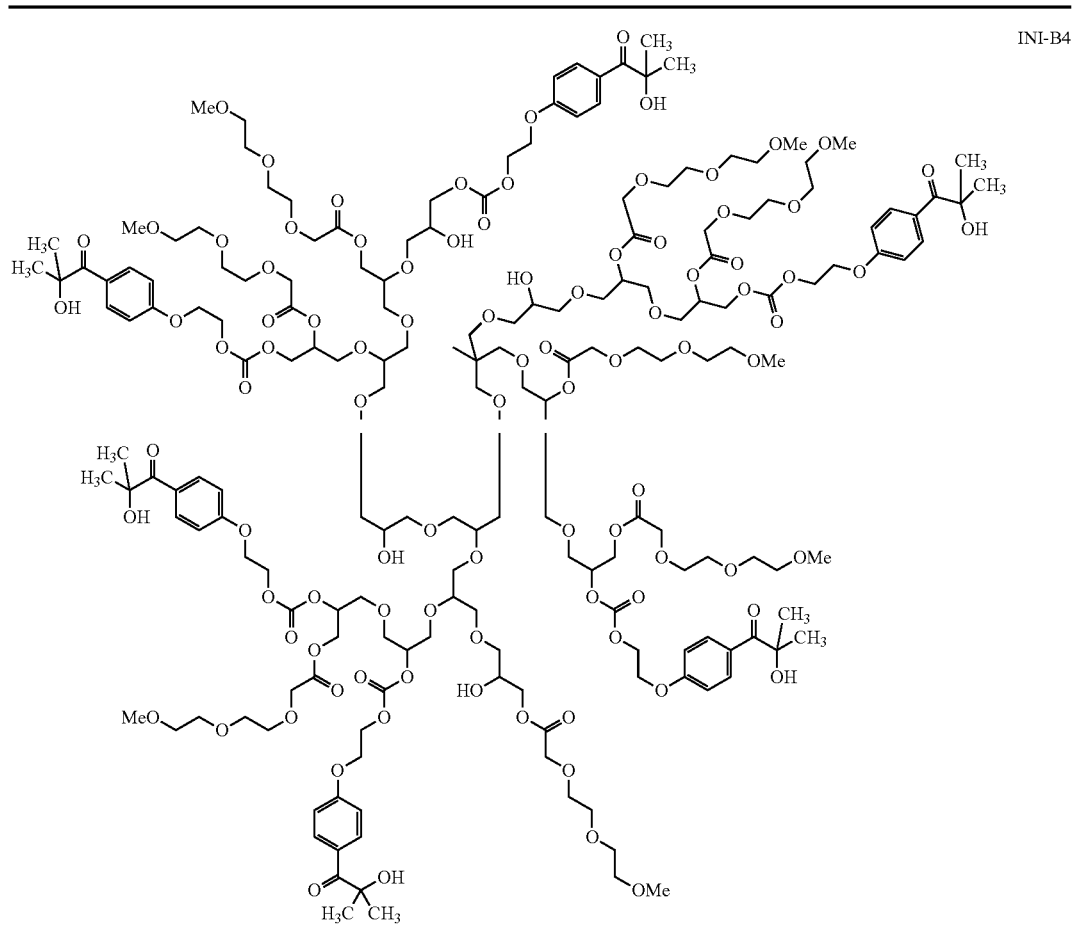
INI-B4
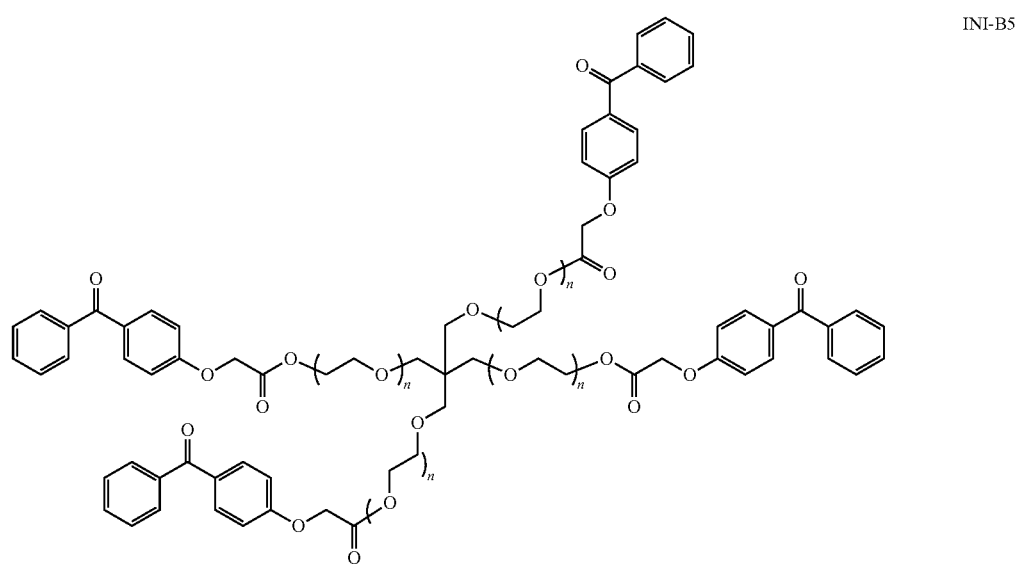
INI-B5
derived from pentaerythritol ethoxylate (15/4 EO/OH)

TABLE 5-continued
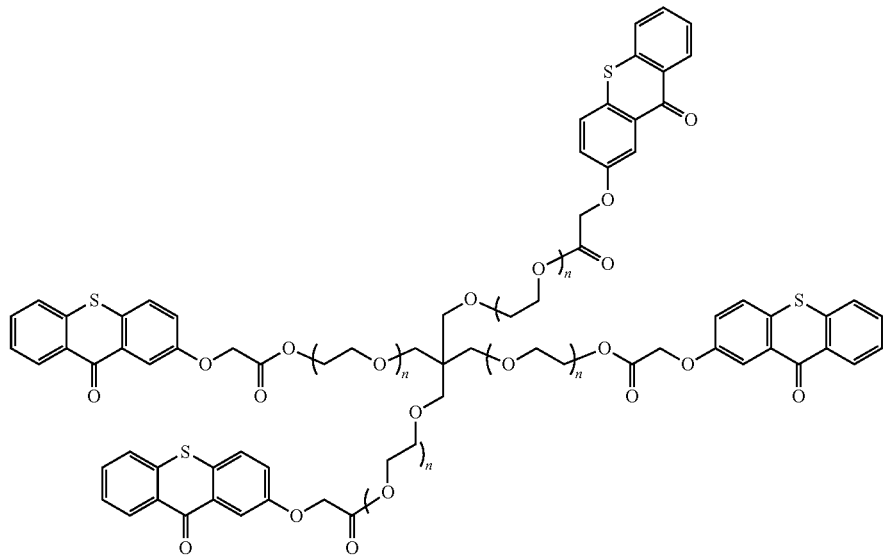
INI-B6
derived from pentaerythritol ethoxylate (15/4 EO/OH)
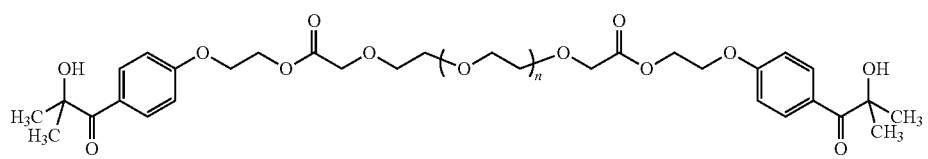
INI-B7
derived from poly(ethylene glycol) bis(carboxymethyl) ether 250
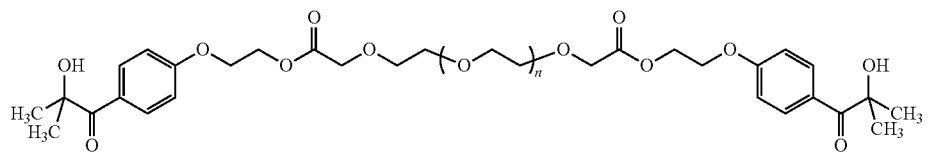
INI-B8
derived from poly(ethylene glycol) bis(carboxymethyl) ether 600
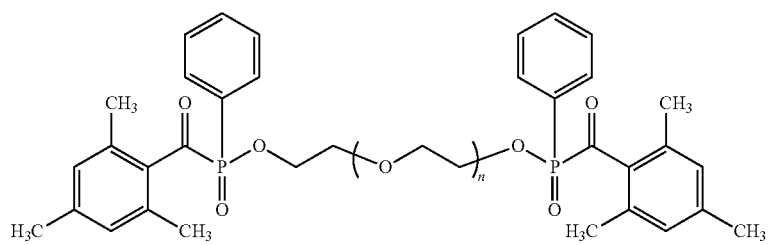
INI-B9
derived from poly(ethylene glycol) 200
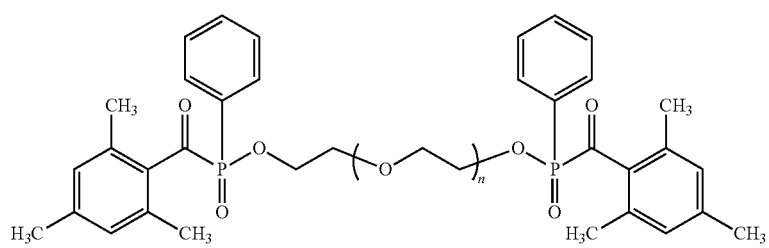
INI-B10
derived from poly(ethylene glycol) 600

TABLE 5-continued

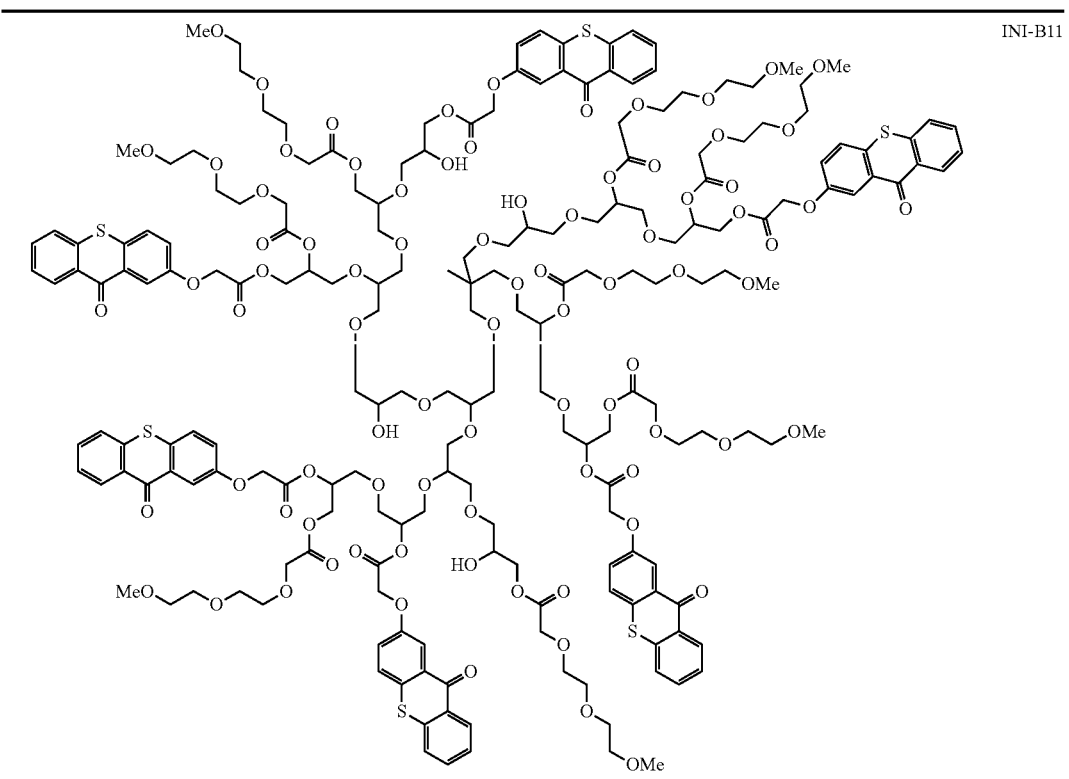

INI-B11

Suitable polymerizable initiators have been disclosed in DE 3534645 (MERCK) and EP 377191 A (BASF).

Suitable initiators have also been described by Baeumer et al. (RADCUR '86, Conference Proceedings (1986), 4/43-4/55), Ruhlmann et al. (European Polymer Journal, 28(9), 1063-1067 (1992)) and Allen et al. (Journal of Photochemistry and Photobiology, A: Chemistry: 130(1,2), 185-189 (1997)).

Preferred polymerizable initiators are given by Table 6, without being limited thereto.

TABLE 6

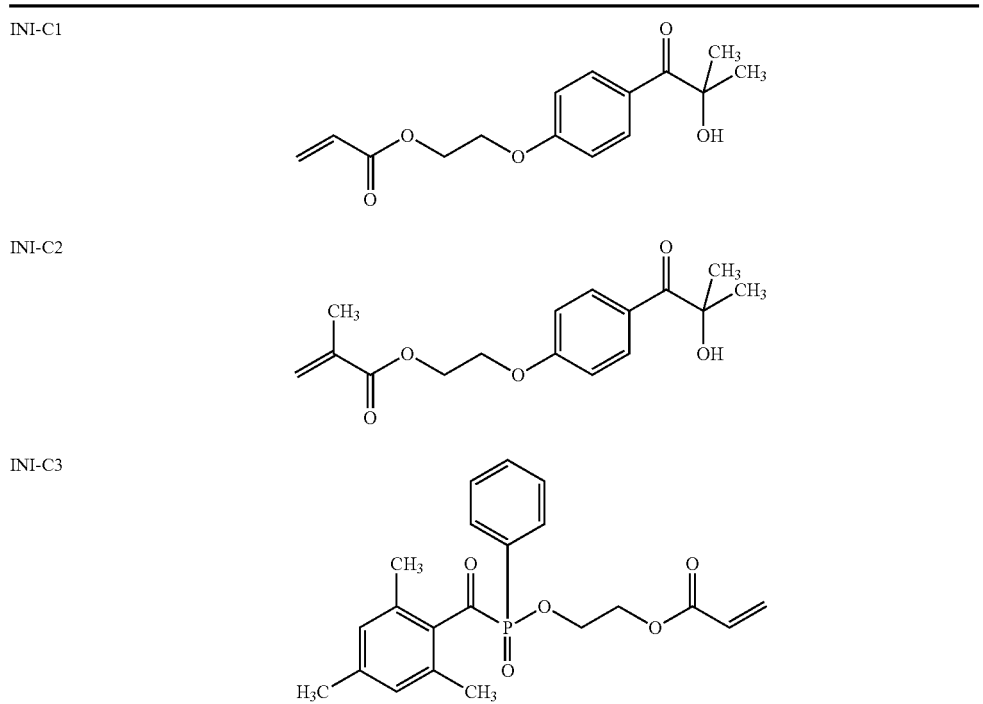

TABLE 6-continued
INI-C4
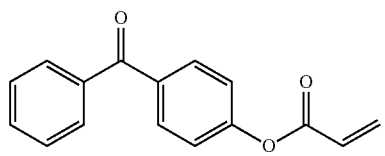 [SMILES: C=CC(=O)Oc1ccc(C(=O)c2ccccc2)cc1]
INI-C5
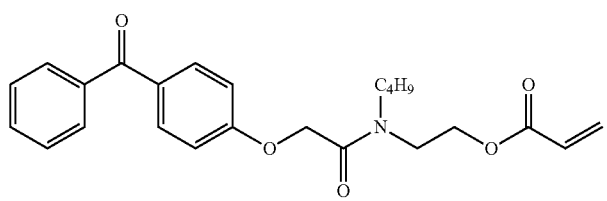
INI-C6
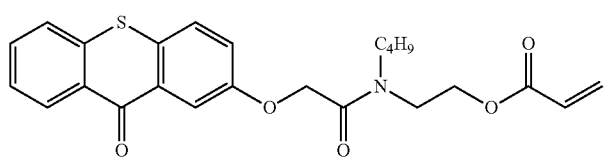
INI-C7
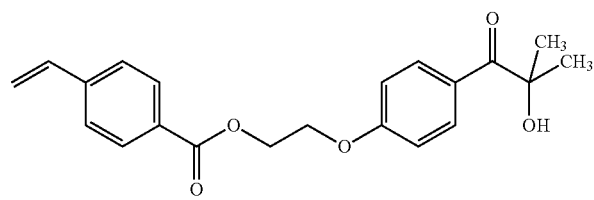 [SMILES: C=Cc1ccc(C(=O)OCCOc2ccc(C(=O)C(C)(C)O)cc2)cc1]
INI-C8
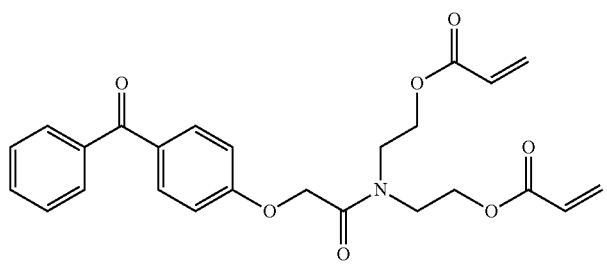 [SMILES: C=CC(=O)OCCN(CCOC(=O)C=C)C(=O)COc1ccc(C(=O)c2ccccc2)cc1]
INI-C9
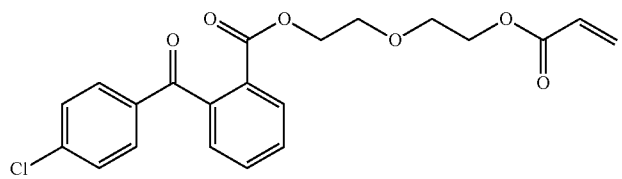 [SMILES: C=CC(=O)OCCOCCOC(=O)c1ccccc1C(=O)c1ccc(Cl)cc1]
INI-C10
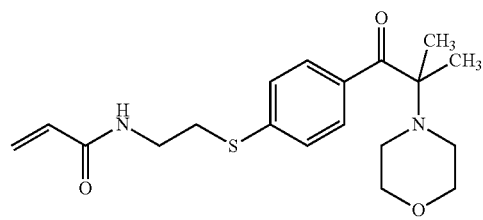 [SMILES: C=CC(=O)NCCSc1ccc(C(=O)C(C)(C)N2CCOCC2)cc1]

TABLE 6-continued

INI-C11
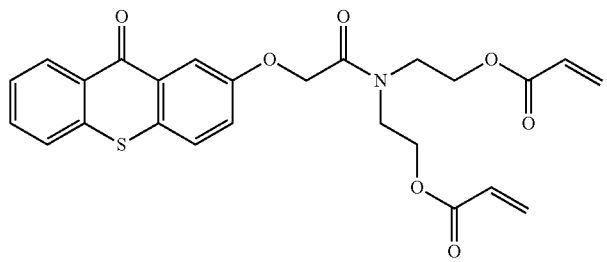 [SMILES: C=CC(=O)OCCN(CCOC(=O)C=C)C(=O)COc1ccc2sc3ccccc3c(=O)c2c1]

INI-C12
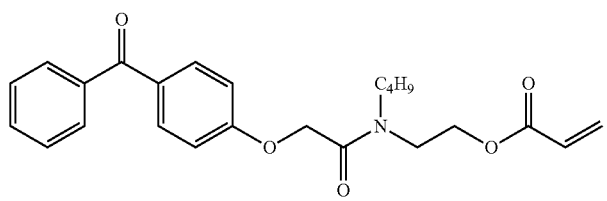

INI-C13
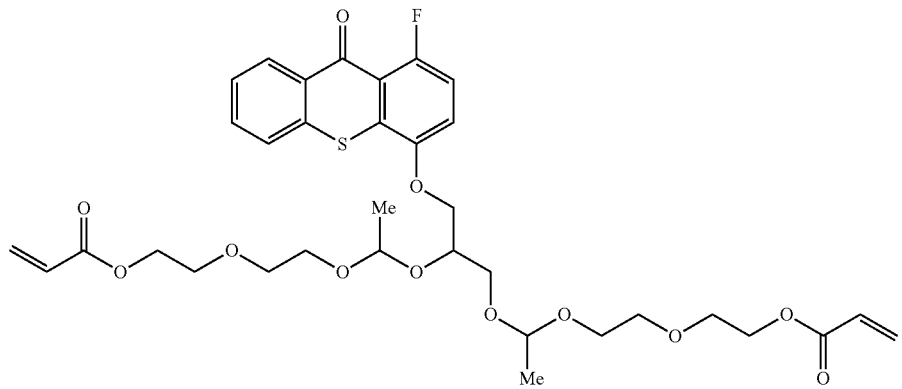 [SMILES: C=CC(=O)OCCOCCOC(C)OCC(COc1ccc(F)c2c(=O)c3ccccc3sc12)OC(C)OCCOCCOC(=O)C=C]

Diffusion Hindered Co-Initiators

The radiation curable liquids, according to a preferred embodiment of the present invention preferably further include at least one diffusion hindered co-initiator selected from the group consisting of multifunctional, oligomeric, polymeric or polymerizable ethylenically unsaturated co-initiators. The at least one diffusion hindered co-initiator is preferably selected from the group consisting of aliphatic tertiary amines and dialkylamino substituted aromatic compounds, dialkylamino substituted aromatic compounds being preferred, 4-dialkylamino benzoic acid derivatives being the most preferred.

Suitable oligomeric co-initiators are given by Table 7 without being limited thereto.

TABLE 7

OLIGOCOINI-1
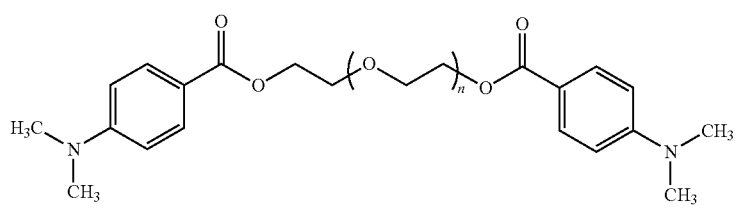

n: 13 on average

TABLE 7-continued
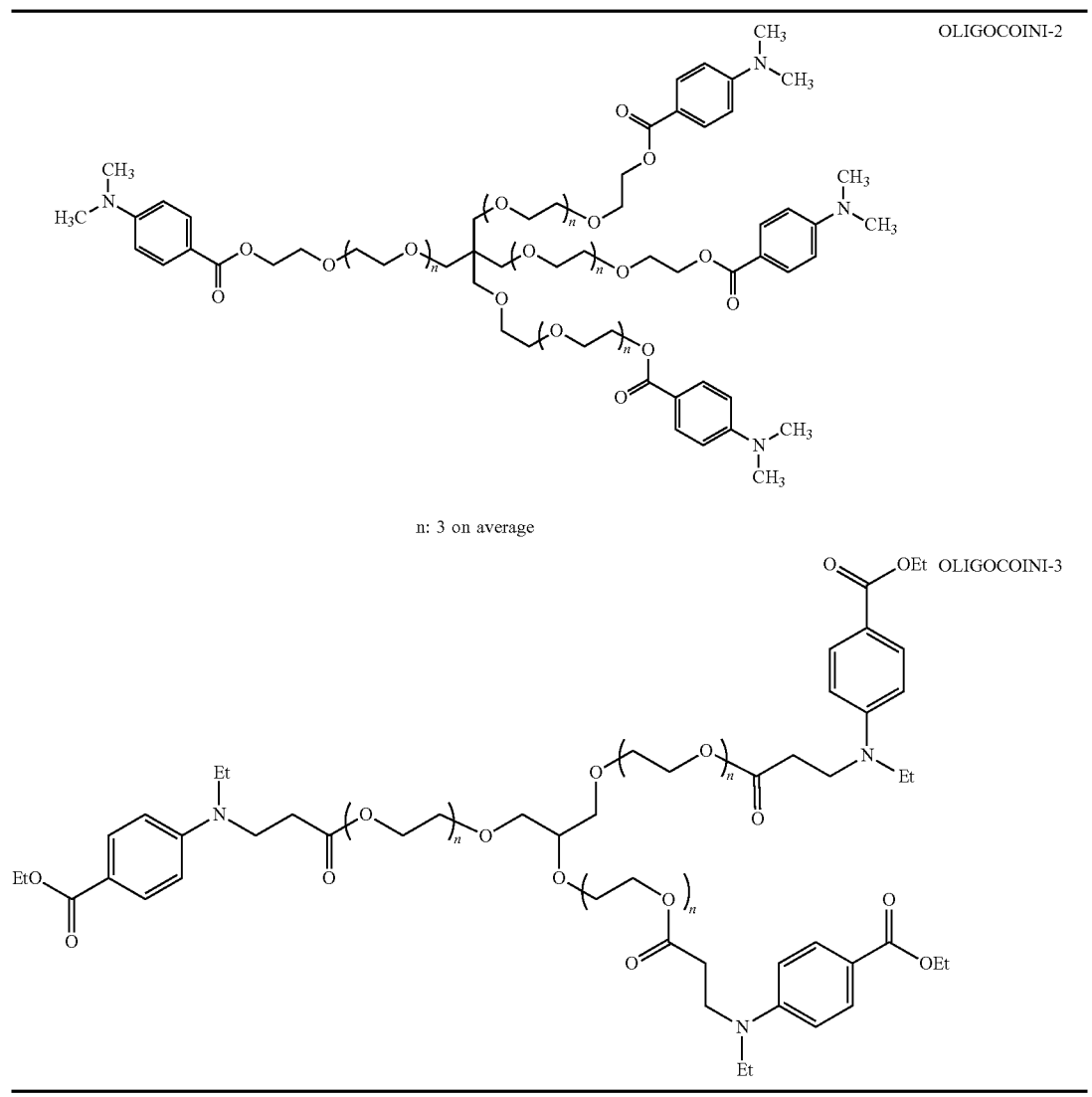
n: 3 on average
Preferred polymeric co-initiators are the hyperbranched polymeric co-initiators disclosed by EP 1616897 A (AGFA) and EP 1616922 A (AGFA).
Preferred examples of multifunctional co-initiators are given by Table 8 without being limited thereto.
TABLE 8
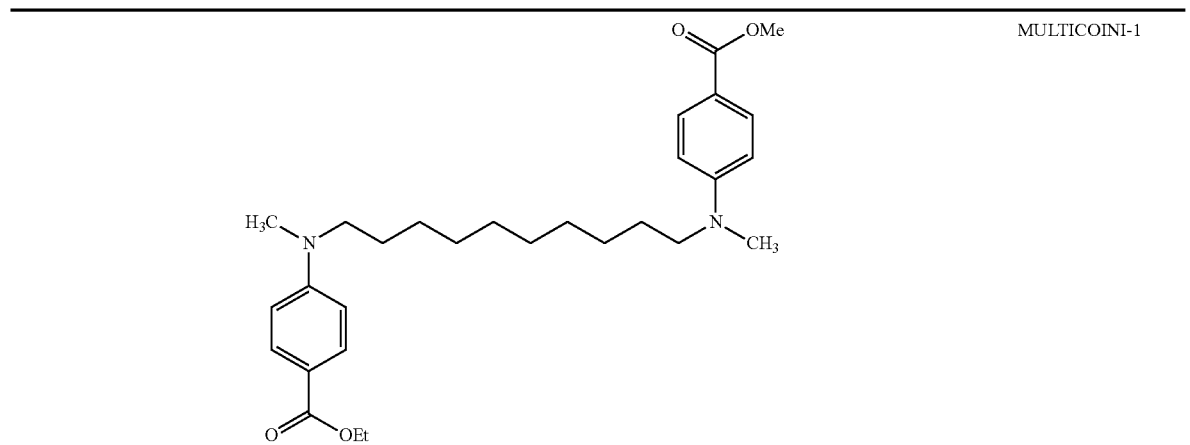

TABLE 8-continued
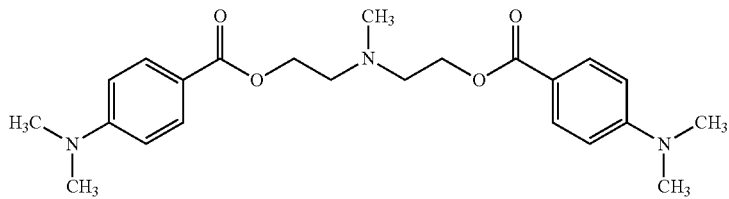
MULTICOINI-2
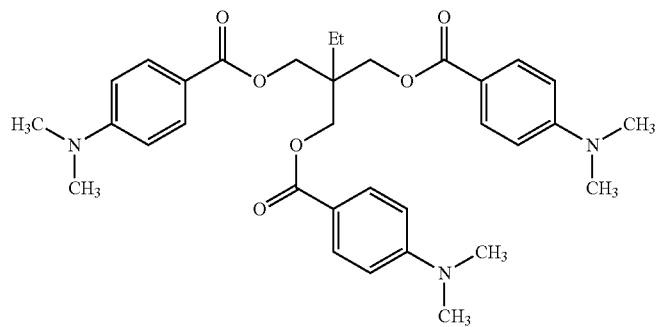
MULTICOINI-3
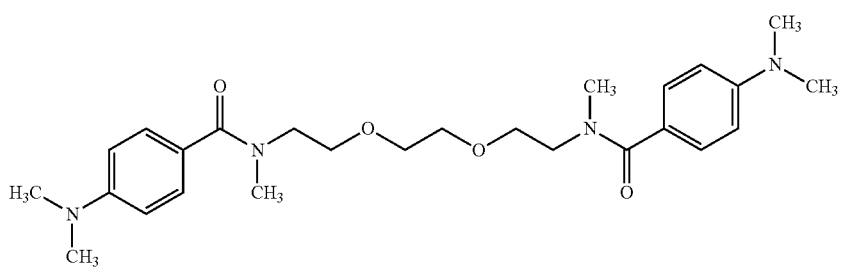
MULTICOINI-4
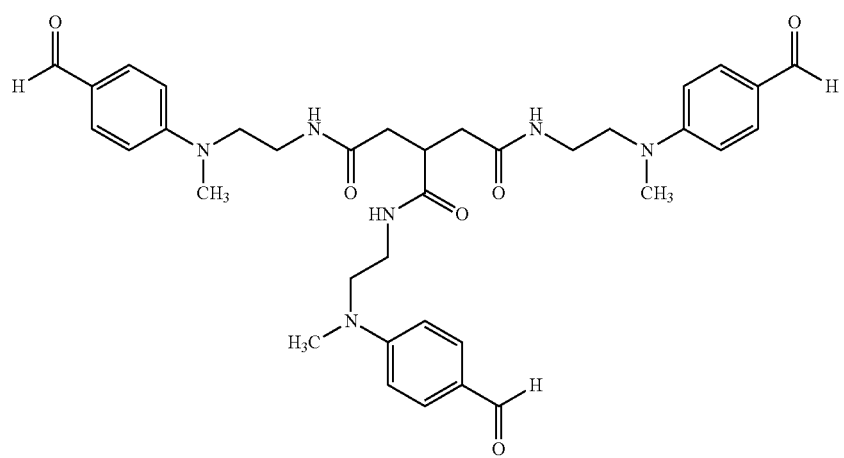 [SMILES: CN(CCNC(=O)CC(CC(=O)NCCN(C)c1ccc(C=O)cc1)C(=O)NCCN(C)c1ccc(C=O)cc1)c1ccc(C=O)cc1]
MULTICOINI-5

TABLE 8-continued
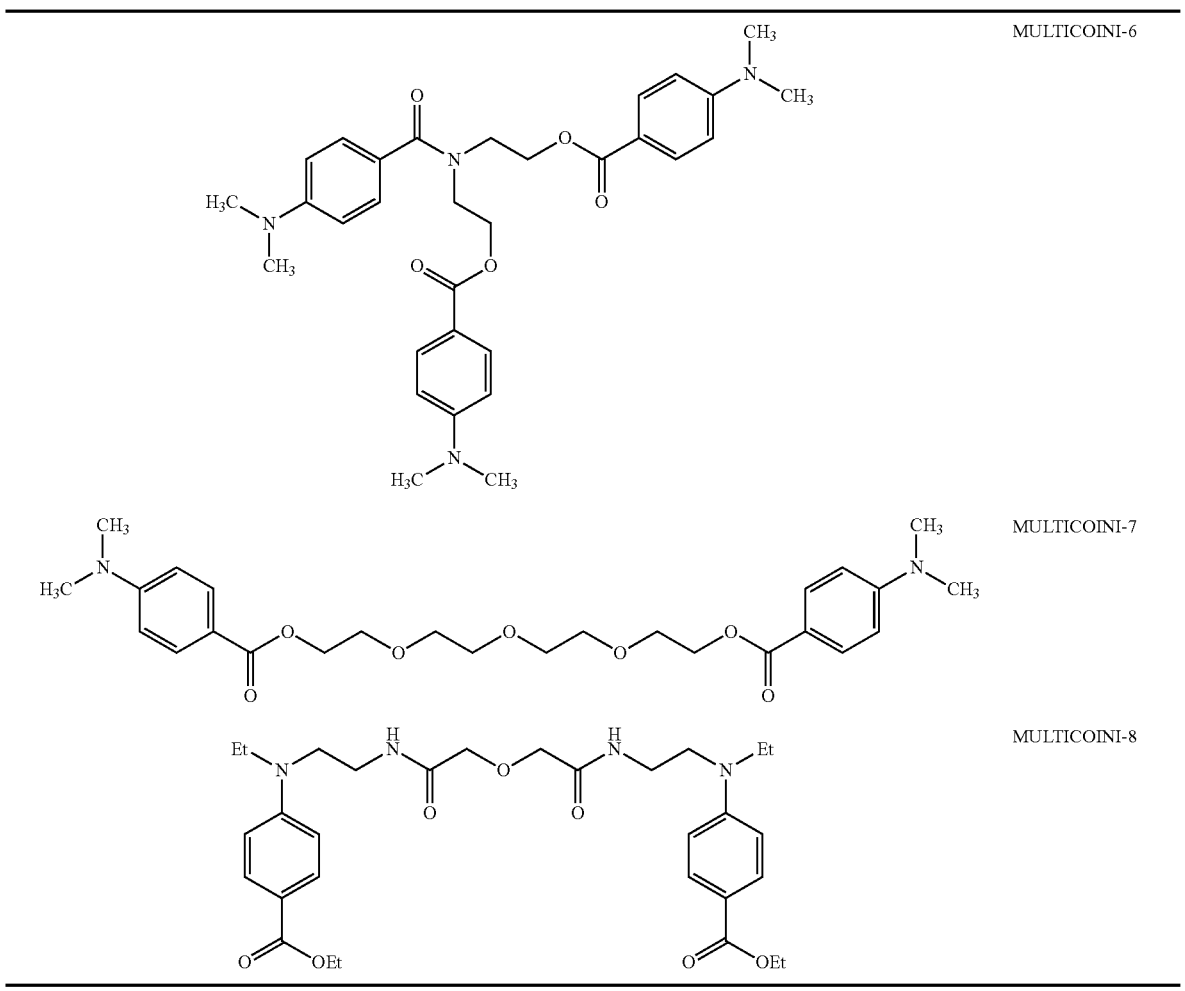
Preferred examples of polymerizable ethylenically unsaturated co-initiators are given by Table 9 without being limited thereto.
TABLE 9
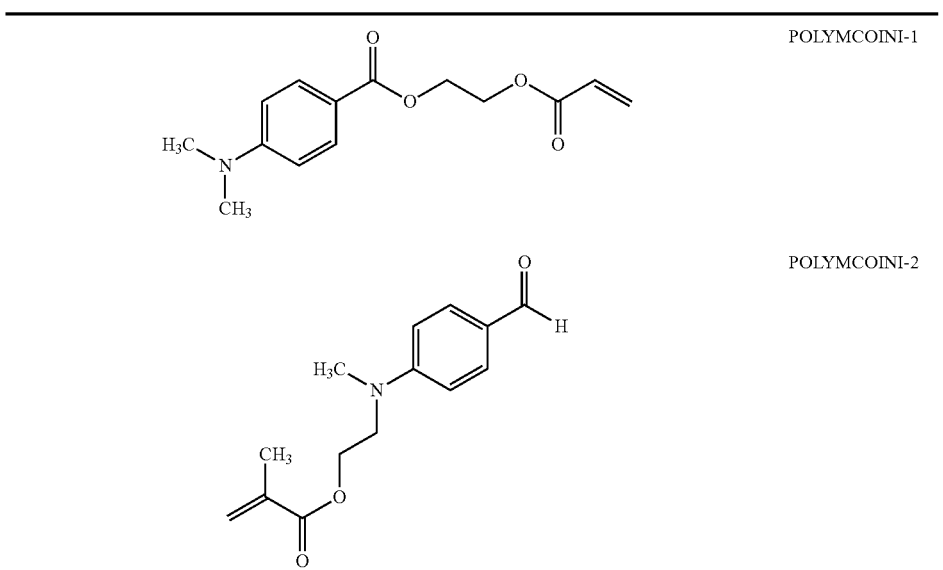

TABLE 9-continued
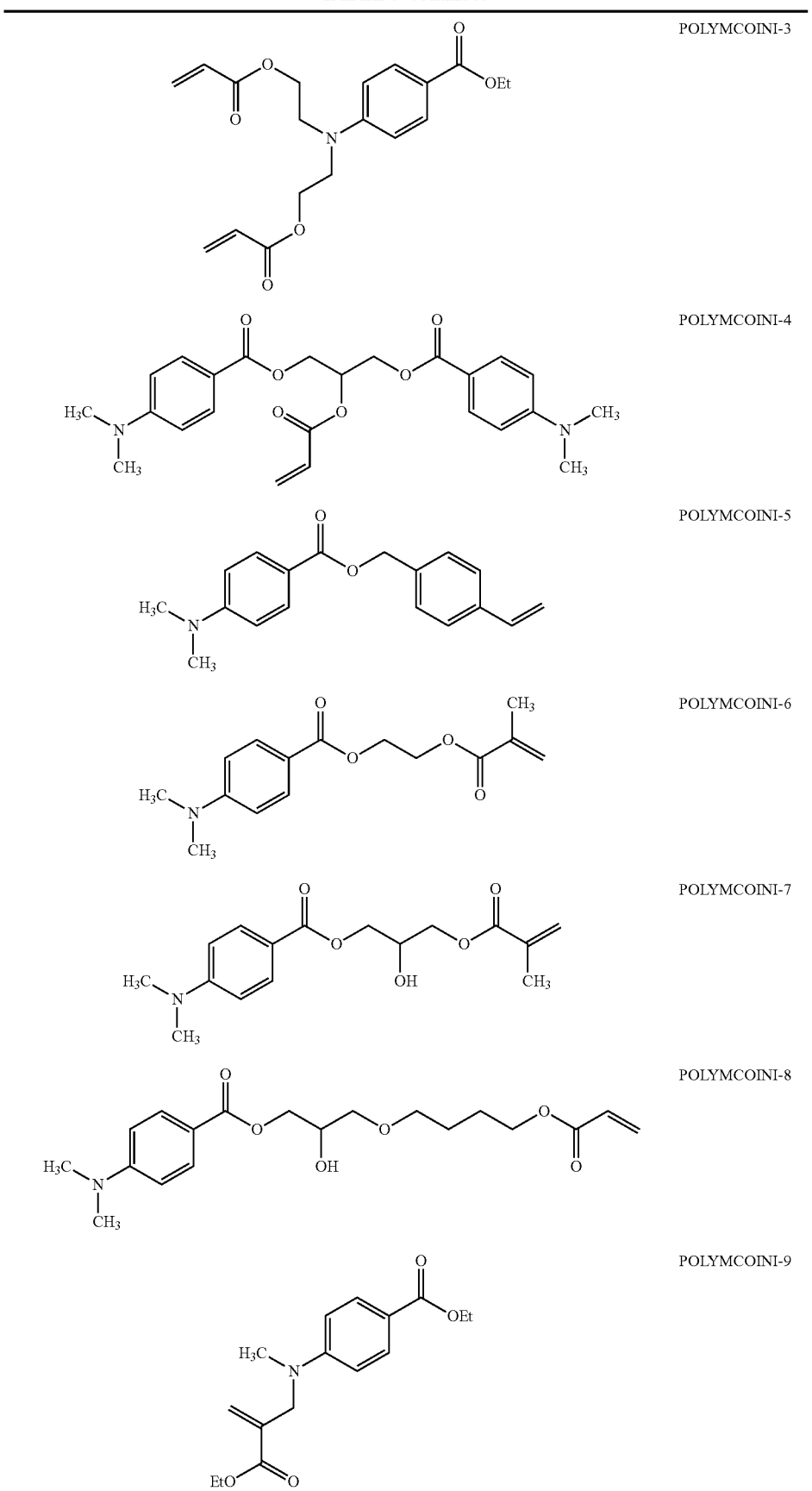

TABLE 9-continued

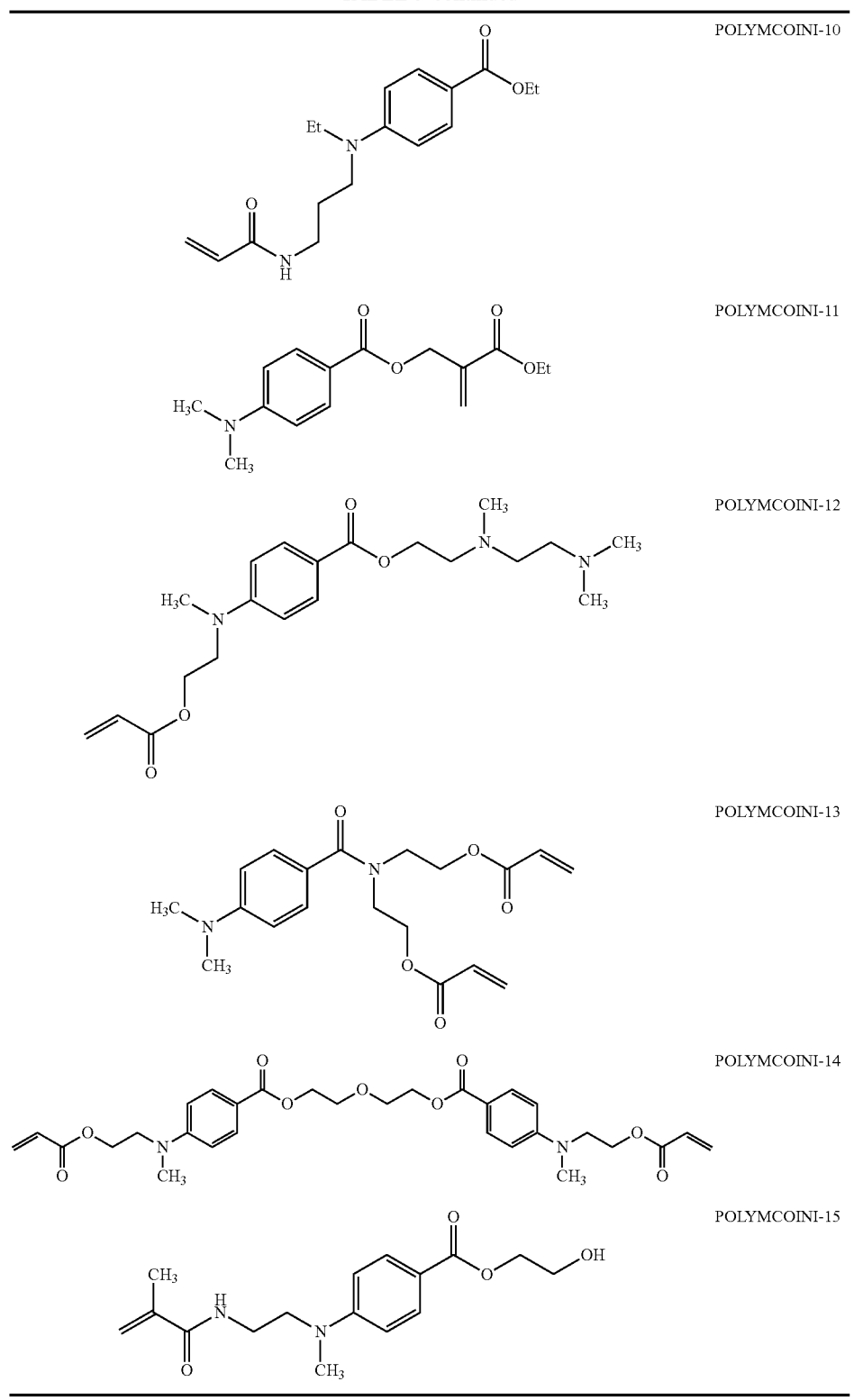

Radiation Curable Inkjet Inks

The radiation curable inkjet ink preferably includes at least 20 wt % vinyl ether acrylate based on the total weight of the radiation curable inkjet ink.

The radiation curable inkjet ink is preferably a free radical curable inkjet ink.

The photoinitiators for the radiation curable inkjet ink are preferably selected from the list of diffusion hindered photoinitiators given above for the radiation curable liquid. The photoinitiator is preferably a polymeric or polymerizable photoinitiator, most preferably a polymerizable photoinitiator for obtaining a very low viscosity of the inkjet ink.

The co-initiators for the radiation curable inkjet ink are preferably selected from the list of diffusion hindered co-initiators given above for the radiation curable liquid The co-initiator is preferably a polymeric or polymerizable co-initiator, most preferably a polymerizable co-initiator for obtaining a very low viscosity of the inkjet ink.

In a preferred embodiment, the radiation curable inkjet ink includes no initiator or otherwise one or more initiators selected from the group consisting of non-polymeric di- or multifunctional initiators, oligomeric initiators, polymeric initiators and polymerizable initiators; wherein the polymerizable composition of the radiation curable inkjet ink consists essentially of:
a) 25-100 wt % of one or more polymerizable compounds A having at least one acrylate group and at least one vinylether group;
b) 0-55 wt % of one or more polymerizable compounds B selected from the group consisting of monofunctional acrylates and difunctional acrylates; and
c) 0-55 wt % of one or more polymerizable compounds C selected from the group consisting of trifunctional acrylates, tetrafunctional acrylates, pentafunctional acrylates and hexafunctional acrylates, with the proviso that if the weight percentage of compounds B>24 wt %, then the weight percentage of compounds C>1 wt %; and wherein all weight percentages of A, B and C are based upon the total weight of the polymerizable composition.

The radiation curable inkjet ink is preferably part of a radiation curable inkjet ink set. Such a curable ink set preferably includes at least one yellow curable ink (Y), at least one cyan curable ink (C) and at least one magenta curable ink (M) and preferably also at least one black curable ink (K). The curable CMYK-ink set may also be extended with extra inks such as red, green, blue, and/or orange to further enlarge the colour gamut. The CMYK ink set may also be extended by the combination of the full density inkjet inks with light density inkjet inks. The combination of dark and light colour inks and/or black and grey inks improves the image quality by a lowered graininess.

The pigmented radiation curable ink preferably contains a dispersant, more preferably a polymeric dispersant, for dispersing the pigment. The pigmented curable ink may contain a dispersion synergist to improve the dispersion quality and stability of the ink. Preferably, at least the magenta ink contains a dispersion synergist. A mixture of dispersion synergists may be used to further improve dispersion stability.

The viscosity of the radiation curable inkjet ink is preferably smaller than 20 mPa·s at 45° C. and at a shear rate of 1,000 s$^{-1}$, more preferably between 1 and 14 mPa·s at 45° C. and a shear rate of 1,000 s$^{-1}$.

For high speed, high resolution printing, the viscosity measured at 45° C. is preferably smaller than 10 mPa·s at 45° C. and at a shear rate of 90 s$^{-1}$. Such measurement can be performed using a Brookfield DV-II+ viscometer at 45° C. and at 12 rotations per minute.

The surface tension of the curable liquid or inkjet ink is preferably in the range of about 20 mN/m to about 70 mN/m at 25° C., more preferably in the range of about 22 mN/m to about 40 mN/m at 25° C.

Monomers and Oligomers

The monomers and oligomers used in radiation curable liquids and inkjet inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Any monomer or oligomer capable of free radical polymerization may be used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the radiation curable liquids and inks can be adjusted by varying the ratio between the monomers and oligomers.

Particularly preferred monomers and oligomers are those listed in [0106] to [0115] in EP 1911814 A (AGFA GRAPHICS).

Inhibitors

The radiation curable liquid and inkjet ink may further also contain at least one inhibitor for improving the thermal stability of the ink.

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol, 2,6-di-tert.butyl-4-methylphenol (=BHT) may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

The inhibitor is preferably a polymerizable inhibitor.

Since excessive addition of these polymerization inhibitors may lower the curing speed, it is preferred that the amount capable of preventing polymerization is determined prior to blending. The amount of a polymerization inhibitor is preferably lower than 5 wt %, more preferably lower than 3 wt % of the total radiation curable liquid or ink.

Colorants

Colorants used in the radiation curable inkjet inks may be dyes, pigments or a combination thereof. Organic and/or inorganic pigments may be used. The colorant is preferably a pigment or a polymeric dye, most preferably a pigment.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs [0128] to [0138] of WO 2008/074548 (AGFA GRAPHICS).

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For some inkjet applications, a neutral black inkjet ink is preferred and can be obtained, for example, by mixing a black pigment and a cyan pigment into the ink. The inkjet application may also require one or more spot colours, for example for packaging inkjet printing or textile inkjet printing. Silver and gold are often desired colours for inkjet poster printing and point-of-sales displays.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. An average particle size smaller than 0.050 μm is less desirable for decreased fastness, but mainly also because very small pigment particles or individual pigment molecules thereof may still be extracted in food packaging applications. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function However for white pigment inkjet inks, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

The pigments are preferably present in the range of 0.01 to 15%, more preferably in the range of 0.05 to 10% by weight and most preferably in the range of 0.1 to 5% by weight, each based on the total weight of the pigment dispersion. For white pigment dispersions, the white pigment is preferably present in an amount of 3% to 40% by weight of the pigment dispersion, and more preferably 5% to 35%. An amount of less than 3% by weight cannot achieve sufficient covering power and usually exhibits very poor storage stability and ejection property.

Dispersants

The dispersant is preferably a polymeric dispersant. Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymer side chains attached to the backbone); and mixed forms of these polymers, e.g. blocky gradient copolymers.

Suitable polymeric dispersants are listed in the section on "Dispersants", more specifically [0064] to [0070] and to [0077], in EP 1911814 A (AGFA GRAPHICS).

The polymeric dispersant has preferably a number average molecular weight Mn between 500 and 30000, more preferably between 1500 and 10000.

The polymeric dispersant has preferably a weight average molecular weight Mw smaller than 100000, more preferably smaller than 50000 and most preferably smaller than 30000.

The polymeric dispersant has preferably a polydispersity PD smaller than 2, more preferably smaller than 1.75 and most preferably smaller than 1.5.

Commercial examples of polymeric dispersants are the following:

DISPERBYK™ dispersants available from BYK CHEMIE GMBH;
SOLSPERSE™ dispersants available from NOVEON;
TEGO™ DISPERS™ dispersants from EVONIK;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC (BASF);
DISPONER™ dispersants from DEUCHEM; and
JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC (BASF) and Disperbyk™ dispersants from BYK CHEMIE GMBH. Particularly preferred dispersants are Solsperse™ 32000, 35000 and 39000 dispersants from NOVEON.

The polymeric dispersant is preferably used in an amount of 2 to 600 wt %, more preferably 5 to 200 wt % based on the weight of the pigment.

Dispersion Synergists

A dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally.

Preferably the ratio wt % polymeric dispersant/wt % dispersion synergist is selected between 2:1 to 100:1, preferably between 2:1 and 20:1.

Suitable dispersion synergists that are commercially available include Solsperse™ 5000 and Solsperse™ 22000 from NOVEON.

Particular preferred pigments for the magenta ink used are a diketopyrrolopyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. Solsperse™ 5000 from NOVEON is preferred. Suitable dispersion synergists for yellow inkjet inks include those disclosed in EP 1790697 A (AGFA GRAPHICS).

In a preferred embodiment, the dispersion synergist includes one, two or more carboxylic acid groups and preferably no sulfonic acid groups.

Surfactants

The radiation curable liquid and inkjet ink may further also contain at least one surfactant for obtaining good spreading characteristics on a substrate. The surfactant(s) can be anionic, cationic, non-ionic, or zwitterionic and are usually added in a total quantity less than 10 wt % based on the total weight of the radiation curable liquid or ink and particularly in a total less than 5 wt % based on the total weight of the radiation curable liquid or ink.

Surfactants in inkjet ink reduce the surface tension of the ink in order to reduce the contact angle on the ink-receiver, i.e. to improve the wetting of the ink-receiver by the ink. On the other hand, the jettable ink must meet stringent performance criteria in order to be adequately jettable with high precision, reliability and during an extended period of time. To achieve both wetting of the ink-receiver by the ink and high jetting performance, typically, the surface tension of the ink is reduced by the addition of one or more specific surfactants. In the case of curable inkjet inks, however, the surface tension of the inkjet ink is not only determined by the amount and type of surfactant, but also by the polymerizable compounds, the polymeric dispersants and other additives in the ink composition.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants include fluoro surfactants (such as fluorinated hydrocarbons) and silicone surfactants. The silicones are typically siloxanes and can be alkoxylated, polyether modified, polyester modified, polyether modified hydroxy functional, amine modified, epoxy modified and other modifications or combinations thereof. Preferred siloxanes are polymeric, for example polydimethylsiloxanes.

Examples of useful commercial silicone surfactants are those supplied by BYK CHEMIE GMBH (including Byk™—302, 307, 310, 331, 333, 341, 345, 346, 347, 348, UV3500, UV3510 and UV3530), those supplied by TEGO CHEMIE SERVICE (including Tego Wet™ 270 and Tego Rad™ 2100, 2200N, 2250, 2300, 2500, 2600 and 2700), Ebecryl™ 1360 a polysilixone hexaacrylate from CYTEC INDUSTRIES BV and Efka™-3000 series (including Efka™-3232 and Efka™-3883) from EFKA CHEMICALS B.V.

The fluorinated or silicone compound used as a surfactant is preferably a cross-linkable surfactant. Suitable polymerizable compounds having surface-active effects include, for example, polyacrylate copolymers, silicone modified acrylates, silicone modified methacrylates, acrylated siloxanes, polyether modified acrylic modified siloxanes, fluorinated acrylates, and fluorinated methacrylate. These acrylates can be mono-, di-, tri- or higher functional (meth)acrylates.

Depending upon the application a surfactant can be used with a high, low or intermediate dynamic surface tension. Silicone surfactants are generally known to have low dynamic surface tensions while fluorinated surfactants are known to have higher dynamic surface tensions.

Silicone surfactants are preferred in radiation curable liquids and inkjet inks, especially the reactive silicone surfactants, which are able to be polymerized together with the polymerizable compounds during the curing step.

Substrates

The radiation curable liquid can be applied as a primer to a substrate, preferably a substrate suitable as packaging, especially as food packaging.

The primers are preferably applied onto synthetic or semi synthetic resin based substrates. Preferred substrates include at least one resin selected from the group consisting of polyester, such as polyethylene terephthalate and polyethylene naphthalate; polyamide; polyvinyl chloride; polyvinylidene chloride; polycarbonate; polystyrene; acrylonitrile-butadiene-styrene; cellulose derivatives, such as cellulose triacetate; and polyolefin, such as polypropylene and polyethylene.

In a more preferred embodiment, the substrate includes at least one synthetic resin selected from the group consisting of polyethylene terephthalate, polypropylene and polyethylene.

In a preferred embodiment, the synthetic resin (e.g. polyester, polyethylene and polypropylene) is 'oriented' by stretching the material to align the molecules in either one direction (uniaxial orientation) or two (biaxial orientation) to increase their strength, clarity, flexibility and moisture/gas barrier properties.

Lamination (bonding together) of two or more films improves the appearance, barrier properties or mechanical strength of a packaging.

Preferred packaging materials include laminates of polypropylene, polyethylene and/or polyethylene terephthalate. Particularly preferred laminates include those including a metallic layer, preferably an aluminium layer.

In a preferred embodiment, the laminate is selected from the group consisting of polyvinylidene chloride coated polypropylene, polyvinylidene chloride coated polypropylene-polyethylene, cellulose-polyethylene-cellulose, cellulose acetate-paper-foil-polyethylene, metallised polyester-polyethylene and polyethylene-aluminium-paper.

In another embodiment, a laminate for use as packaging material is formed after inkjet printing. For example, a polyolefin substrate having an adhesive layer is laminated on the inkjet printed layer of a polyolefin substrate having on one side cured layers of the radiation curable liquid used as a primer and at least one radiation curable inkjet ink printed on that primer.

Coextrusion is the simultaneous extrusion of two or more layers of different polymers to make a film. Coextruded films have three main advantages over other types of film: they have very high barrier properties, similar to laminates but produced at a lower cost; they are thinner than laminates and are therefore easier to use on filling equipment; and the layers do not separate.

In a preferred embodiment, the coextruded film is made by a three-layer coextrusion having an outside layer that has a high gloss and printability, a middle bulk layer which provides stiffness and strength, and an inner layer which is suitable for heat sealing.

Preferably the polymers for coextrusion are selected from the group consisting of polyethylene terephthalate, polyethylene, polypropylene, polystyrene, acrylonitrile-butadiene-styrene and polyvinyl chloride.

The radiation curable liquid can be applied as the primer to one of the above substrates and then be cured or not before jetting the radiation curable inkjet ink. Preferably the primer is at least partially cured on the substrate. Partial curing has the advantage of a better adhesion of the radiation curable inkjet ink to the primer than when the primer is first fully cured. Fully curing has the advantage that the substrate can be stored before use. Partial curing is performed during the inkjet printing process.

A preferred embodiment includes the combination of the radiation curable liquid according to the present invention and a substrate including at least one resin selected from the group consisting of polyester; polyamide; polyvinyl chloride; polyvinylidene chloride; polycarbonate; polystyrene; acrylonitrile-butadiene-styrene; cellulose derivatives; and polyolefins. Preferably the above combination further comprises at least radiation curable inkjet ink.

Inkjet Printing Methods

An inkjet printing method according to a preferred embodiment of the present invention includes the steps of applying a radiation curable liquid as defined above; and jetting a radiation curable inkjet ink including at least 20 wt % of vinyl ether acrylate.

The radiation curable liquid can be applied as a primer on a substrate and preferably at least partially cured before jetting the radiation curable inkjet ink thereon. This way it prevents migration of e.g. a vinyl ether acrylate into the substrate. The radiation curable liquid can also be applied as a varnish on top of the radiation curable inkjet ink. This way it prevents set-off of the vinyl ether acrylate onto the backside of the substrate.

The primer or overprint varnish according to a preferred embodiment of the present invention can be applied by any appropriate technique, such as coating, offset printing, ink jet printing and flexographic printing, ink jet printing and flexographic printing being more preferred, flexographic printing being the most preferred.

In a preferred embodiment of the inkjet printing method according to the present invention, the radiation curable liquid is applied by flexographic printing to a substrate.

The inkjet printing method according to a preferred embodiment of the present invention is preferably performed on a substrate including at least one resin selected from the group consisting of polyester; polyamide; polyvinyl chloride; polyvinylidene chloride; polycarbonate; polystyrene; acrylonitrile-butadiene-styrene; cellulose derivatives; and polyolefins.

The inkjet printing method according to a preferred embodiment of the present invention preferably employs at least one radiation curable inkjet ink including no initiator or otherwise one or more initiators selected from the group consisting of non-polymeric di- or multifunctional initiators, oligomeric initiators, polymeric initiators and polymerizable initiators;

wherein the polymerizable composition of the radiation curable inkjet ink consists essentially of:

a) 25-100 wt % of one or more polymerizable compounds A having at least one acrylate group and at least one vinylether group;

b) 0-55 wt % of one or more polymerizable compounds B selected from the group consisting of monofunctional acrylates and difunctional acrylates; and c) 0-55 wt % of one or more polymerizable compounds C selected from the group consisting of trifunctional acrylates, tetrafunctional acrylates, pentafunctional acrylates and hexafunctional acrylates, with the proviso that if the weight percentage of compounds B>24 wt %, then the weight percentage of compounds C>1 wt %;

and wherein all weight percentages of A, B and C are based upon the total weight of the polymerizable composition.

Inkjet Printing Devices

The radiation curable liquids and inkjet inks may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Curing Devices

The radiation curable liquids and inkjet inks according to a preferred embodiment of the present invention can be cured by exposing them to actinic radiation, preferably by ultraviolet radiation.

In inkjet printing, the curing device may be arranged in combination with the print head of the inkjet printer, travelling therewith so that the curable liquid is exposed to curing radiation very shortly after been jetted.

In such an arrangement it can be difficult to provide a small enough radiation source connected to and travelling with the print head, such as LED. Therefore, a static fixed radiation source may be employed, e.g. a source of curing UV-light, connected to the radiation source by flexible radiation conductor such as a fiber optic bundle or an internally reflective flexible tube.

Alternatively, the actinic radiation may be supplied from a fixed source to the radiation head by an arrangement of mirrors including a mirror upon the radiation head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the inkjet printing device contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as Aldrich Chemical Co. (Belgium) and Acros (Belgium) unless otherwise specified. The water used was deionized water.

Thioxanthone-1 is a 22 wt % of a polymerizable thioxanthone according top Formula TX-1 in 2-(2'-vinyloxyethoxy)ethylacrylate:

Formula TX-1

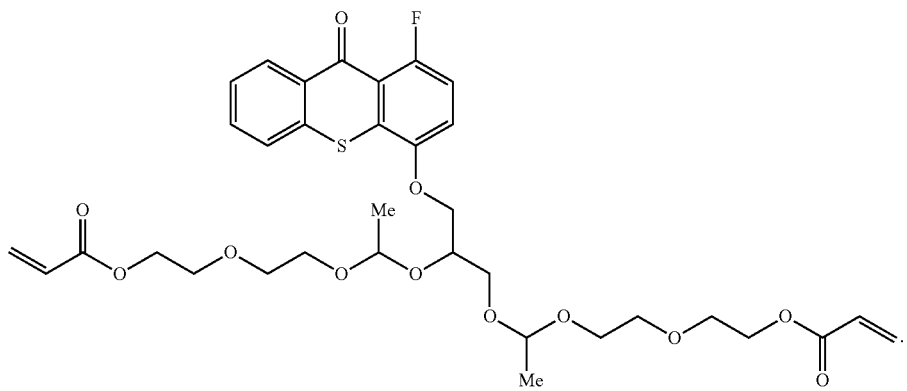

TX-1 was prepared by the following three steps:

Step 1: Synthesis of
1-fluoro-4-hydroxy-thioxanthen-9-one

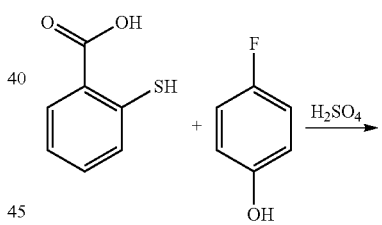

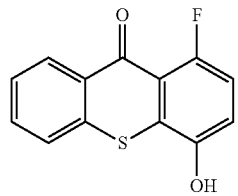

Thiosalicylic acid (5.1 g, 0.033 mol) was added in portions to 20 mL sulfuric acid (18M), which causes the temperature to rise to 30° C. At this temperature 4-fluorophenol (11.2 g, 0.10 mol) was added in portions to the suspension. The mixture was heated to 80° C. and stirred for 12 hours. After the reaction, the reaction mixture was poured into ice (150 g). 1-fluoro-4-hydroxy-thioxanthen-9-one precipitated from the medium and was isolated by filtration. The crude 1-fluoro-4-hydroxy-thioxanthen-9-one was dissolved in water at pH=14 using an aqueous solution of potassium hydroxide and stirred for 60 minutes. The mixture was acidified to pH=4 using acetic acid. 1-fluoro-4-hydroxy-thioxanthen-9-one was isolated by filtration and dried to obtain 5.5 g of 1-fluoro-4-hydroxy-thioxanthen-9-one.

Step 2: Synthesis of 4-(2,3-dihydroxy-propoxy)-1-fluoro-thioxanthen-9-one

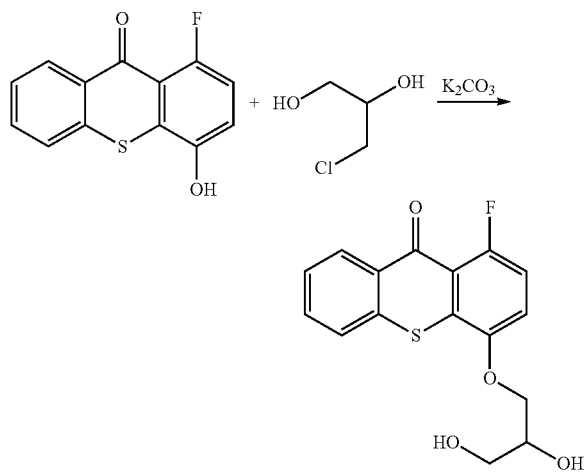

To a suspension of 1-fluoro-4-hydroxy-9H-thioxanthen-9-on (92%) (306 g, 1.14 mol) in acetonitrile (3500 mL), potassium carbonate (464 g, 3.36 mol) was added while stirring vigorously. 3-Chloro-1,2-propanediol (371 g, 3.36 mol) was added drop wise over 30 minutes. The reaction mixture was heated to reflux and allowed to stir for 24 hours. The mixture was filtered and the residue was washed with warm acetonitrile (500 mL) (70° C.). The filtrate was evaporated under reduced pressure. The residual solid was treated with a mixture of methyl-tert-butylether (400 mL) and acetone (40 ml) and stirred for about an hour. The crude 4-(2,3-dihydroxy-propoxy)-1-fluoro-thioxanthen-9-one was isolated by filtration and dried. The crude 4-(2,3-dihydroxy-propoxy)-1-fluoro-thioxanthen-9-one was treated twice with 1000 mL water at 60° C., isolated by filtration and dried.

Step 3: Synthesis of TX-1 in VEEA 4-(2,3-dihydroxy-propoxy)-1-fluoro-thioxanthen-9-one (97.8%) (117.9 g, 0.36 mol), 2,6-di-tert-butyl-4-methylphenol (1.6 g, 7.2 mol) and trifluoroacetic acid ((1.64 g=1.07 mL, 14.4 mol) were added to 2-(2'-vinyloxyethoxy)ethylacrylate (998 g). This solution was heated at 70° C. and stirred for 6 hours. After cooling down to room temperature, activated Lewatit™ M600 MB (16.4 g) was added and stirred for 1 hour. After removal of Lewatit™ M600 MB by filtration, a 22 wt % solution of acrylic acid 2-(2-{1-[2-(2-acryloyloxy-ethoxy)-ethoxy]-ethoxy}-3-(1-fluoro-9-oxo-9H-thioxanthen-4-yloxy)-propoxy)ethoxy}-ethylester in 2-(2'-vinyloxyethoxy)ethylacrylate was obtained.

Irgastab™ UV 10 is a difunctional nitroxyl radical based stabilizer supplied by BASF (Ciba).

Speedcure™ 7040 is a polymeric 4-dimethylbenzoic acid derivative supplied by Lambson.

Quantacure™ EHA is 4-dimethylaminobenzoic acid 2-ethylhexyl ester supplied by Ciba (BASF)

Irgacure™ 819 is phenylbis(2,4,6-trimethylbenzoyl)-phosphine oxide supplied by Ciba (BASF).

Omnipol™ 910 is a polymeric photoinitiator, supplied by IGM, having the following general structure:

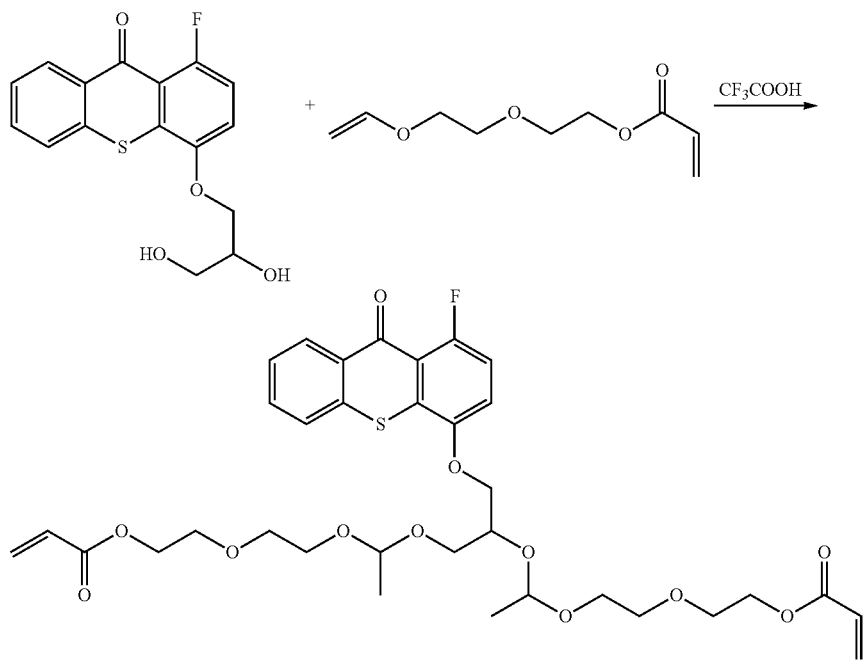

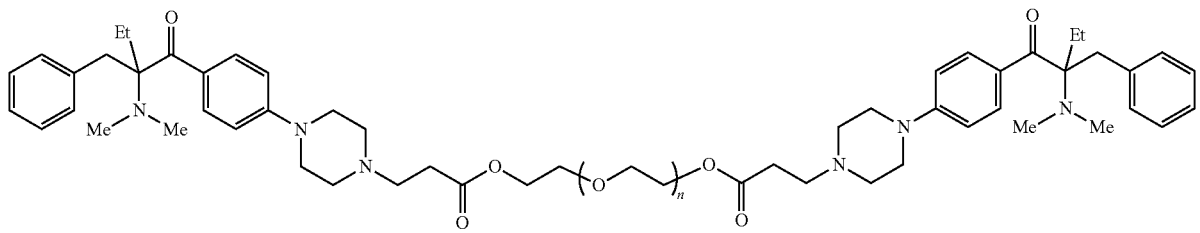

Irgacure™ 369 is 2-(dimethylamino)-2-[(4-methylphenyl)methyl]-1-[4-(4-morpholinyl)phenyl]-1-butanone supplied by Ciba (BASF).

Byk™ UV3510 is a polyether modified polydimethylsiloxane, supplied by BYK-Chemie GmbH.

QDS-1 is a quinacridone dispersion synergist according to the following structure and has been prepared as disclosed in WO 2007/060254 (AGFA):

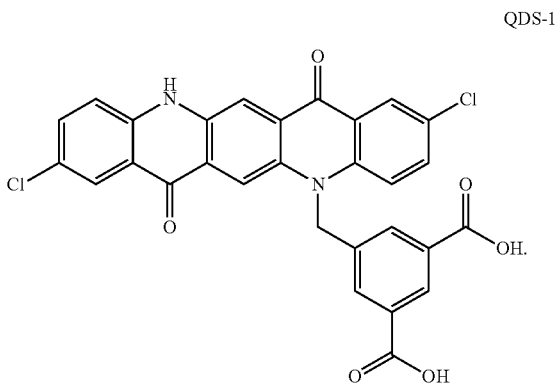 [SMILES: O=C(O)c1cc(Cn2c3ccc(Cl)cc3c(=O)c3cc4[nH]c5ccc(Cl)cc5c(=O)c4cc32)cc(C(=O)O)c1]

QDS-1

Genopol™ AB1 is a polymeric 4-dimethylaminobenzoic acid derivative supplied by Rahn.

Genopol™ BP1 is a polymeric benzophenone derivative supplied by Rahn.

Omnipol™ TX is a polymeric thioxanthone supplied by IGM.

Irgacure™ 819 is supplied by BASF (former Ciba).

SR9003 is a propoxylated neopentyl glycol diacrylate supplied by Sartomer.

VEEA is 2-(2'-vinyloxyethoxy)ethylacrylate supplied by Nippon Shokubai.

Sipomer™ PAM 100 is a phosphate ester of a polyethylene glycol methacrylate supplied by Rhodia. Sipomer™ PAM 300 is a phosphate ester of a polypropylene oxide methacrylate supplied by Rhodia.

Genorad™ 16 is a polymerization inhibitor from RAHN AG.

Cromophtal™ Yellow LA2 is a C.I. Pigment Yellow 150 pigment from CIBA SPECIALTY CHEMICALS.

Special Black™ 550 is a carbon black pigment available from EVONIK (DEGUSSA).

Sun Fast™ Blue 15:4 is a C.I. Pigment Blue 15:4 pigment from SUN CHEMICAL.

Chromophtal™ Jet Magenta 2BC PM-2 is a quinacridone pigment from CIBA SPECIALTY CHEMICALS.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed. The polymer was isolated by precipitation with iso-octane, followed by washing and drying Measurement Methods 1. Average Particle Size The particle size of pigment particles in a pigment dispersion was determined by photon correlation spectroscopy at a wavelength of 633 nm with a 4 mW HeNe laser on a diluted sample of the pigment dispersion. The particle size analyzer used was a Malvern™ nano-S available from Goffin-Meyvis.

The sample was prepared by addition of one drop of pigment dispersion to a cuvette containing 1.5 mL ethyl acetate and mixed until a homogenous sample was obtained. The measured particle size is the average value of 3 consecutive measurements consisting of 6 runs of 20 seconds.

2. Determination of the Migration

Extraction cells conform EN 1186-1 (cell type B) were used in the migration experiments. Two circles with a diameter of 15 cm were cut from a printed sample. The two circles are mounted in the extraction cells with the non printed side in contact with the extraction solvent. The cells were closed and the cells were filled with iso-octane as food simulant. The cells were stored at room temperature for two days (conditions compliant with EC 10/2011, 2002/72/EC, 97/48/EC and 85/572/EEC for testing fatty foods for prolonged storage at room temperature). The extract was filtered over a 0.2 μm filter and analyzed with HPLC for quantification of VEEA.

The chromatographic method used an Altima™ C18 5 μm column (150×3.2 mm) supplied by Alltech. A flow rate of 0.5 ml/min was used at a temperature of 40° C. A UV-VIS detection at 204 nm was used. The HPLC method used for all samples had an applied gradient with an end run=38 min as given in Table 10 wherein eluent A was water and eluent B was acetonitrile.

TABLE 10

| Time (min) | % eluent A | % eluent B |
|---|---|---|
| 0 | 55 | 45 |
| 6 | 55 | 45 |
| 11 | 0 | 100 (linear gradient) |
| 30 | 0 | 100 |
| 31 | 55 | 45 |
| 38 | 55 | 45 |

15 μl of the extract was injected and the VEEA concentration was determined in comparison with a reference sample (5 μl injected from of a solution of 1 mg in 50 ml of CH3CN and dilutions thereof). The migrated amount of VEEA is expressed as food ppb. The amount, migrated from the total surface area of each sample in contact with iso-octane, expressed in μg, was recalculated to 6 dm², which corresponds to the surface area of a box containing one liter of a simulant. The recalculated amount of VEEA, expressed in μg corresponds to the amount that would have been migrated through the total surface area of the box in contact with one liter of the simulant. If the simulant would have a density of one, the extracted amount would correspond to the total amount of VEEA expressed as μg in one kilogram of simulant or ppb.

Preparation of Inkjet Ink Set

A radiation curable CMYK inkjet ink set was prepared according to Table 11. All weight percentages (wt %) are based on the total weight of the inkjet ink.

TABLE 11

| Ink component | wt % in Y | wt % in M | wt % in C | wt % in K |
|---|---|---|---|---|
| Dispersion 1 | 18.00 | — | — | — |
| Dispersion 2 | — | — | — | 15.87 |
| Dispersion 3 | — | — | 16.00 | 1.13 |
| Dispersion 4 | — | 22.00 | — | 2.67 |
| VEEA | 66.38 | 30.14 | 34.98 | 23.00 |
| Irgastab ™ UV10 | 0.20 | 0.20 | 0.20 | 0.20 |
| Thioxanthone-1 | 5.00 | 41.66 | 41.66 | 48.63 |
| Speedcure ™ 7040 | 1.42 | 2.50 | 1.16 | — |
| Quantacure ™ EHA | — | — | — | 2.00 |
| Irgacure ™ 819 | 3.00 | — | 2.50 | 3.00 |
| Omnipol ™ 910 | 5.00 | — | 2.50 | 2.50 |
| Irgacure ™ 369 | — | 2.50 | — | — |
| Byk ™ UV 3510 | 1.00 | 1.00 | 1.00 | 1.00 |

The pigment dispersions Dispersion 1 to Dispersion 4 were prepared in the manner described here below.

Dispersion 1

A 30 wt % solution of DB162 in VEEA was prepared. 1 wt % Genorad™ 16 was added. 1.5 kg Cromophtal™ Yellow LA2 was added to a mixture of 1.95 kg VEEA, 2.5 kg of the DB162 solution and 50 g Genorad™ 16, while stirring with a DISPERLUX™ disperser (from DISPERLUX S.A.R.L., Luxembourg). Stirring was continued for 30 minutes. The vessel was connected to a DYNO™-MILL ECM Pilot mill from the company Willy A. Bachofen (Switzerland), preloaded with 1.5 kg VEEA and filled for 42% with 0.4 mm yttrium stabilized zirconia beads ("high wear resistant zirconia grinding media" from TOSOH Co.). The mixture was circulated over the mill for 5 hours 52 minutes at a flow rate of 1.5 l/min and a rotation speed in the mill of about 13 m/s. During the milling procedure, an additional 2.5 kg of the DB162 solution was added. During the complete milling procedure the content in the mill was cooled to keep the temperature below 40° C. After milling, the dispersion was discharged into a 15 L-vessel. The resulting concentrated pigment dispersion Dispersion 1 according to Table exhibited an average particle size of 148 nm.

TABLE 12

| Component | wt % |
|---|---|
| Cromophtal ™ Yellow LA2 | 15 |
| DB162 | 15 |
| Genorad ™ 16 | 1 |
| VEEA | 69 |

Dispersion 2

A 30 wt % solution of DB162 in VEEA was prepared. 1 wt % Genorad™ 16 was added. 1.103 kg Special Black 550 and 0.397 kg Sun Fast™ Blue 15:4 were added to a mixture of 1.95 kg VEEA, 2.5 kg of the DB162 solution and 50 g Genorad™ 16, while stirring with a DISPERLUX™ disperser (from DISPERLUX S.A.R.L., Luxembourg). Stirring was continued for 30 minutes. The vessel was connected to a DYNO™-MILL ECM Pilot mill from the company Willy A. Bachofen (Switzerland), preloaded with 1.5 kg 2-(2'-vinyloxyethoxy)ethylacrylate and filled for 42% with 0.4 mm yttrium stabilized zirconia beads ("high wear resistant zirconia grinding media" from TOSOH Co.). The mixture was circulated over the mill for 5 hours 52 minutes at a flow rate of 1.5 l/min and a rotation speed in the mill of about 13 m/s. During the milling procedure, an additional 2.5 kg of the DB162 solution was added. During the complete milling procedure the content in the mill was cooled to keep the temperature below 40° C. After milling, the dispersion was discharged into a 15 L-vessel. The resulting concentrated pigment dispersion Dispersion 2 according to Table 13 exhibited an average particle size of 101 nm.

TABLE 13

| Component | wt % |
|---|---|
| Special Black ™ 550 | 11 |
| Sun Fast ™ Blue 15:4 | 4 |
| DB162 | 15 |
| Genorad ™ 16 | 1 |
| VEEA | 69 |

Dispersion 3

A 30 wt % solution of DB162 in VEEA was prepared. 1 wt % Genorad™ 16 was added. 1.5 kg Sun Fast™ Blue 15:4 was added to a mixture of 1.95 kg VEEA, 2.5 kg of the DB162 solution and 50 g Genorad™ 16, while stirring with a DISPERLUX™ disperser (from DISPERLUX S.A.R.L., Luxembourg). Stirring was continued for 30 minutes. The vessel was connected to a DYNO™-MILL ECM Pilot mill from the company Willy A. Bachofen (Switzerland), preloaded with 1.5 kg VEEA and filled for 42% with 0.4 mm yttrium stabilized zirconia grinding media" from TOSOH Co.). The mixture was circulated over the mill for 5 hours 52 minutes at a flow rate of 1.5 l/min and a rotation speed in the mill of about 13 m/s. During the milling procedure, an additional 2.5 kg of the DB162 solution was added. During the complete milling procedure the content in the mill was cooled to keep the temperature below 40° C. After milling, the dispersion was discharged into a 15 L-vessel. The resulting concentrated pigment dispersion Dispersion 3 according to Table 14 exhibited an average particle size of 85 nm.

TABLE 14

| Component | wt % |
|---|---|
| Sun Fast ™ Blue 15:4 | 15 |
| DB162 | 15 |
| Genorad ™ 16 | 1 |
| VEEA | 69 |

Dispersion 4

A 30 wt % solution of DB162 in VEEA was prepared. 1 wt % Genorad™ 16 was added. 1.5 kg Chromophtal™ Jet Magenta 2BC and 80 g of dispersion synergist 1 were added to a mixture of 1.87 kg VEEA, 2.5 kg of the DB162 solution and 50 g Genorad™ 16, while stirring with a DISPERLUX™ disperser (from DISPERLUX S.A.R.L., Luxembourg). Stirring was continued for 30 minutes. The vessel was connected to a DYNO™-MILL ECM Pilot mill from the company Willy A. Bachofen (Switzerland), preloaded with 1.5 kg VEEA and filled for 42% with 0.4 mm yttrium stabilized zirconia beads ("high wear resistant zirconia grinding media" from TOSOH Co.). The mixture was circulated over the mill for 5 hours 52 minutes at a flow rate of 1.5 l/min and a rotation speed in the mill of about 13 m/s. During the milling procedure, an additional 2.5 kg of the DB162 solution was added. During the complete milling procedure the content in the mill was cooled to keep the temperature below 40° C. After milling, the dispersion was discharged into a 15 L-vessel. The resulting concentrated pigment dispersion Dispersion 4 according to Table 15 exhibited an average particle size of 85 nm.

TABLE 15

| Component | wt % |
| --- | --- |
| Chromophtal ™ Jet Magenta 2BC | 15 |
| QDS-1 | 0.8 |
| DB162 | 15 |
| Genorad ™ 16 | 1 |
| VEEA | 68.2 |

Preparation of Primers

Three radiation curable liquids Primer 1 to Primer 3 were formulated to be used as a primer in an inkjet printing in accordance with the invention. Their composition is given in Table 16, expressed as weight percentage of the total weight of the primer composition.

TABLE 16

| wt % of compound | Primer 1 | Primer 2 | Primer 3 |
| --- | --- | --- | --- |
| Genopol ™ AB1 | 4 | 4 | 4 |
| Genopol ™ BP1 | 4 | 4 | 4 |
| Omnipol ™ TX | 3 | 3 | 3 |
| Irgacure ™ 819 | 2 | 2 | 2 |
| SR9003 | 67 | 67 | 72 |
| Triglycidyl diacrylate | 15 | 15 | 15 |
| Sipomer ™ PAM 100 | 5 | — | — |
| Sipomer ™ PAM 300 | — | 5 | — |

Primer 1 to primer 3 were respectively coated on BOPP (a 30 μm biaxial oriented polypropylene supplied as Propafilm RGP by INNOVIA), and on PE (a 50 μm LDPE substrate, supplied by SEGERS & BALCAEN), using a 10 μm wired bar and cured using a Fusion DRSE-120 conveyer, equipped with a Fusion VPS/1600 lamp (D-bulb), which transported the samples under the UV-lamp of the conveyer until no visual damage was seen when whipping the surface with a Q-tip.

This led to four inventive substrates S1 to S4 and four comparative substrates S5 to S6 as defined in Table 17.

TABLE 17

| Substrate | Type |
| --- | --- |
| S1 | 30 μm BOPP primed with primer 1 |
| S2 | 30 μm BOPP primed with primer 2 |
| S3 | 50 μm PE primed with primer 1 |
| S4 | 50 μm PE primed with primer 2 |
| S5 | 30 μm BOPP primed with primer 3 |
| S6 | 50 μm PE primed with primer 3 |
| S7 | unprimed 30 μm BOPP |
| S8 | unprimed 50 μm PE |

Inkjet Printing and Image on the Substrates

A checker board type of pattern according to Table 18 was printed on each of the primed and unprimed substrates, wherein 1 represents a dark grey patch, 2 represents a light grey patch and 3 represents a green patch. The patches were printed, using the different inks of Table 11 using the screen percentages given in Table 19.

TABLE 18

| 1 | 2 | 3 | 1 | 2 | 3 |
| --- | --- | --- | --- | --- | --- |
| 3 | 1 | 2 | 3 | 1 | 2 |
| 2 | 3 | 1 | 2 | 3 | 1 |

TABLE 19

| Patch | Colour | Screen percentages of | | | |
| --- | --- | --- | --- | --- | --- |
| | | C | M | Y | K |
| 1 | Dark grey | — | — | — | 100 |
| 2 | Light grey | 60 | 60 | 60 | 20 |
| 3 | Green | 100 | — | 100 | 60 |

The patches were printed using a Kyocera™ KJ4A print head at a printing speed of 50 m/min in grey scale mode. The printing order was KCMY and LED pinning at 395 nm was used after printing K, C and M, using a water cooled LED with an output wavelength of 395 nm from Integration Technologies used at 0.75 W/cm$^2$ (250 mJ/cm$^2$). The printed image was immediately off line further cured on a Fusion DRSE-120 conveyer using first a D bulb followed by a V bulb at maximum power and a belt speed of 40 m/min.

Evaluation and Results

Two circles with a diameter of 15 cm were cut from each printed sample and the migration was determined.

TABLE 20

| Substrate | Migrateable VEEA (food ppb) |
| --- | --- |
| S1 | <10 |
| S2 | 12 |
| S3 | <10 |
| S4 | 11 |
| S5 | 368 |
| S6 | 181 |
| S7 | 1086 |
| S8 | 8207 |

From Table 20, it should be clear that the primers according to a preferred embodiment of the present invention almost completely block the migration of VEEA through polyolefin type of substrates.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A radiation curable liquid comprising:
   at least one free radical polymerizable monomer or oligomer;
   at least one multifunctional, oligomeric, polymeric, or polymerizable acetalysation catalyst;

at least one multifunctional, oligomeric, polymeric, or polymerizable hydroxyl containing compound including at least two hydroxyl groups; and at least one polymeric or polymerizable photoinitiator.

2. The radiation curable liquid according to claim 1 consisting essentially of:
  50.0 to 98.5 wt % of the at least one free radical polymerizable monomer or oligomer;
  0.5 to 20.0 wt % of the at least one multifunctional, oligomeric, polymeric, or polymerizable acetalysation catalyst;
  1.0 to 30.0 wt % of the at least one multifunctional, oligomeric, polymeric, or polymerizable hydroxyl containing compound;
  up to 20.0 wt % of the at least one polymeric or polymerizable photoinitiator;
  0 to 20.0 wt % of at least one multifunctional, oligomeric, polymeric, or polymerizable co-initiator;
  0 to 35.0 wt % of white pigment;
  0 to 25.0 wt % of polymeric dispersant; and
  0 to 10.0 wt % of surfactant.

3. The radiation curable liquid according to claim 1, wherein the acetalysation catalyst is provided and is selected from the group consisting of a polymeric sulfonic acid, an oligomeric sulfonic acid, a polymerizable sulfonic acid, a polymeric phosphoric acid, an oligomeric phosphoric acid, a polymerizable phosphoric acid, a polymeric phosphonic acid, an oligomeric phosphonic acid, a polymerizable phosphonic acid, a polymeric pyridinium sulfonate, an oligomeric pyridinium sulfonate, and a polymerizable pyridinium sulfonate.

4. The radiation curable liquid according to claim 1, wherein the at least one multifunctional, oligomeric, polymeric, or polymerizable hydroxyl containing compound is selected from the group consisting of a polymeric compound, an oligomeric compound, and a polymerizable compound.

5. A kit comprising a radiation curable liquid according to claim 1 and a radiation curable inkjet ink including at least 20 wt % vinyl ether acrylate based on a total weight of the radiation curable inkjet ink.

6. The kit according to claim 5, wherein
a polymerizable composition of the radiation curable inkjet ink consists essentially of:
  a) 25-100 wt % of one or more polymerizable compounds A having at least one acrylate group and at least one vinylether group;
  b) 0-55 wt % of one or more polymerizable compounds B selected from the group consisting of monofunctional acrylates and difunctional acrylates; and
  c) 0-55 wt % of one or more polymerizable compounds C selected from the group consisting of trifunctional acrylates, tetrafunctional acrylates, pentafunctional acrylates, and hexafunctional acrylates; wherein
  if a weight percentage of compounds B>24 wt %, then a weight percentage of compounds C>1 wt %; and
  all weight percentages of A, B, and C are based upon a total weight of the polymerizable composition.

7. An inkjet printing method comprising the steps of:
applying a radiation curable liquid as defined in claim 1 to a substrate; and
jetting a radiation curable inkjet ink including at least 20 wt % of vinyl ether acrylate to the radiation curable liquid on the substrate.

8. The inkjet printing method according to claim 7, wherein the radiation curable liquid is applied by flexographic printing.

9. The inkjet printing method according to claim 8, wherein the substrate includes at least one resin selected from the group consisting of polyester, polyamide, polyvinyl chloride, polyvinylidene chloride, polycarbonate, polystyrene, acrylonitrile-butadiene-styrene, cellulose derivatives, and polyolefins.

10. The inkjet printing method according to claim 7, wherein
a polymerizable composition of the radiation curable inkjet ink consists essentially of:
  a) 25-100 wt % of one or more polymerizable compounds A having at least one acrylate group and at least one vinylether group;
  b) 0-55 wt % of one or more polymerizable compounds B selected from the group consisting of monofunctional acrylates and difunctional acrylates; and
  c) 0-55 wt % of one or more polymerizable compounds C selected from the group consisting of trifunctional acrylates, tetrafunctional acrylates, pentafunctional acrylates, and hexafunctional acrylates; wherein
  if a weight percentage of compounds B>24 wt %, then a weight percentage of compounds C>1 wt %; and
  all weight percentages of A, B, and C are based upon a total weight of the polymerizable composition.

* * * * *